United States Patent
Wu et al.

(10) Patent No.: US 12,322,748 B2
(45) Date of Patent: Jun. 3, 2025

(54) QUICK-CHANGE PLATFORM, BATTERY PRODUCTION LINE, AND CONTROL METHOD

(71) Applicant: Contemporary Amperex Technology (Hong Kong) Limited, Hong Kong (CN)

(72) Inventors: Kai Wu, Ningde (CN); Hua Huang, Ningde (CN); Yanlin Sun, Ningde (CN); Yuming Xie, Ningde (CN); Wanjin Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/889,127

(22) Filed: Sep. 18, 2024

(65) Prior Publication Data
US 2025/0125398 A1   Apr. 17, 2025

Related U.S. Application Data

(63) Continuation of application No. PCT/CN2023/136129, filed on Dec. 4, 2023.

(30) Foreign Application Priority Data

Oct. 12, 2023   (CN) .......................... 202311320685.3

(51) Int. Cl.
*H01M 10/04* (2006.01)
*B65G 47/91* (2006.01)

(52) U.S. Cl.
CPC ...... *H01M 10/0404* (2013.01); *B65G 47/918* (2013.01); *B65G 2203/044* (2013.01)

(58) Field of Classification Search
CPC ............ H01M 10/0404; B65G 47/918; B65G 2203/044
See application file for complete search history.

(56) References Cited

U.S. PATENT DOCUMENTS

2011/0110754 A1\* 5/2011 Lin ........................ B25J 9/041
                                                     74/490.01
2019/0126340 A1   5/2019 Takeda

FOREIGN PATENT DOCUMENTS

CN   110814694 A   2/2020
CN   111302023 A   6/2020
(Continued)

OTHER PUBLICATIONS

International Search Report for PCT application No. PCT/CN2023/136129, dated Feb. 9, 2024.
(Continued)

*Primary Examiner* — Lingwen R Zeng
(74) *Attorney, Agent, or Firm* — Ladas & Parry LLP

(57) ABSTRACT

A quick-change platform, a battery production line and a control method are disclosed. The quick-change platform includes a tray set. In a first pick-and-place state, the tray set is located in a first pick-and-place position, so as to enable the tray set to receive the target objects removed from a battery module clamp, or enable a battery module transport apparatus to pick the target objects placed on the tray set. In a second pick-and-place state, the tray set is located in a second pick-and-place position, so as to remove the target objects on the tray set, or place the target objects on the tray set.

18 Claims, 14 Drawing Sheets

(56) References Cited

FOREIGN PATENT DOCUMENTS

| | | |
|---|---|---|
| CN | 112058714 A | 12/2020 |
| CN | 212655104 U | 3/2021 |
| CN | 113979106 A | 1/2022 |
| CN | 215755155 U | 2/2022 |
| CN | 218114250 U | 12/2022 |
| CN | 218504300 U | 2/2023 |
| CN | 218908011 U | 4/2023 |
| CN | 116275650 A | 6/2023 |
| CN | 219429079 U | 7/2023 |
| CN | 117049219 A | 11/2023 |
| JP | 2009208186 A | 9/2009 |
| TW | M408261 U | 8/2011 |

OTHER PUBLICATIONS

Written Opinion of the International Searching Authority for PCT application No. PCT/CN2023/136129, dated Feb. 9, 2024.
Notification to Grant Patent Right, CN application No. 202311320685.3, dated Nov. 22, 2023.
Extended European Search Report for EP application No. 23887185.9, dated Feb. 25, 2025.

* cited by examiner

QUICK-CHANGE PLATFORM, BATTERY PRODUCTION LINE, AND CONTROL METHOD

CROSS-REFERENCE TO RELATED APPLICATIONS

This application is a continuation of International Patent Application No. PCT/CN2023/136129, filed on Dec. 4, 2023, which claims priority to Chinese Patent Application No. 202311320685.3, filed on Oct. 12, 2023. The aforementioned patent applications are incorporated herein by reference in their entirety.

TECHNICAL FIELD

The present disclosure relates to the technical field of battery production, and in particular, to a quick-change platform, a battery production line and a control method.

BACKGROUND

The applications of new energy batteries in daily life and industries are becoming increasingly widespread. For example, new energy vehicles equipped with batteries are widely used. In addition, batteries are increasingly used in the fields of energy storage and the like.

During battery production, it is necessary to use a battery module transport apparatus to load the assembled battery modules into a battery box to form a battery.

The battery module transport apparatus is provided with a sucker for adsorbing a battery module and jaw teeth for clamping the battery module, so that the battery module transport apparatus can grab, transport and release the battery module based on the atmospheric pressure and the friction force between the jaw teeth and the battery module.

For different types of batteries, the sizes, weights and other parameters of battery modules thereof are different, and the models of required jaw teeth and suckers are also different. Therefore, in the process of switching battery production types in a battery production line, the jaw teeth and the sucker on the battery module transport apparatus need to be replaced, which will affect the production efficiency.

SUMMARY

In view of this, embodiments of the present disclosure aim to provide a quick-change platform, a battery production line and a control method, which can improve the production efficiency.

In order to achieve the above purpose, the technical solutions in the embodiments of the present disclosure are implemented as follows:

An embodiment of the present disclosure provides a quick-change platform for placing target objects for a battery module transport apparatus. The target objects are jaw teeth and a sucker. The quick-change platform includes:

a tray set, wherein the tray set is movable, and includes a tray assembly, a sucker placing assembly and a plurality of clamping jaw placing assemblies, the clamping jaw placing assembly and the sucker placing assembly are both arranged on the tray assembly, the clamping jaw placing assembly is configured to place the jaw teeth, and the sucker placing assembly is configured to place the sucker;

the quick-change platform has a first pick-and-place state and a second pick-and-place state;

in the first pick-and-place state, the tray set is located in a first pick-and-place position, so as to enable the tray set to receive the target objects removed from a battery module clamp, or enable the battery module transport apparatus to pick the target objects placed on the tray set; and in the second pick-and-place state, the tray set is located in a second pick-and-place position, so as to remove the target objects on the tray set, or place the target objects on the tray set.

According to the quick-change platform in the embodiment of the present disclosure, by driving the tray set to switch and move between the first pick-and-place position and the second pick-and-place position, the position of picking and placing the jaw teeth and the sucker by the battery module transport apparatus is different from the position of picking and placing the jaw teeth and the sucker by staff. In this way, on the one hand, the probability of interference between the process of performing the picking and placing operations by the battery module transport apparatus and the process of performing the picking and placing operations by the staff is reduced, and the operation safety is improved; and on the other hand, by arranging a plurality of quick-change platforms, the picking and placing operations performed by the battery module transport apparatus and the picking and placing operations performed by the staff can be performed synchronously, that is, the operation times are overlapped, thus reducing the total operation time and improving the production efficiency.

In some embodiments, the quick-change platform includes a driving set, and a driving end of the driving set is drivingly connected to the tray set to drive the tray set to move between the first pick-and-place position and the second pick-and-place position.

In this way, it is beneficial for achieving automatic control of the movement of the tray set.

In some embodiments, at least one of the clamping jaw placing assembly and the sucker placing assembly is detachably connected to the tray assembly. In this way, on the one hand, the purpose of adapting to the jaw teeth and sucker of the corresponding models can be achieved only by dismounting and replacing the clamping jaw placing assembly and the sucker placing assembly, thus reducing the workload; and on the other hand, it is convenient for the staff to transport the clamping jaw placing assembly and the sucker placing assembly together with the jaw teeth and the sucker respectively, thus improving the operation convenience.

In some embodiments, the tray assembly comprises a support plate and a plurality of mounting plates arranged on the support plate, at least one of the mounting plates is movable relative to the support plate, and the clamping jaw placing assembly and the sucker placing assembly respectively correspond to the mounting plate;

the movable mounting plate has a third pick-and-place state and a fourth pick-and-place state;

in the third pick-and-place state, the mounting plate moves to a third pick-and-place position, so as to receive the target objects removed from the battery module transport apparatus, or enable the battery module transport apparatus to pick the target objects; and in the fourth pick-and-place state, the mounting plate moves to a fourth pick-and-place position, so as to remove the target objects on the tray set, or place the target objects on the tray set.

In this way, by enabling the mounting plate to move relative to the support plate, it is beneficial for expanding the moving range of the clamping jaw placing assembly and the sucker placing assembly in a case that the floor area of the quick-change platform is definite, thus further improving the convenience of performing the picking and placing operations by the staff.

In some embodiments, the mounting plate provided with the sucker placing assembly is in sliding fit with the support plate. In this way, the convenience of picking and placing the sucker by the staff is improved.

In some embodiments, the tray set comprises a detection assembly, the detection assembly is arranged on the support plate, and comprises a through-beam photoelectric sensor and a driving element, an emitting end and a receiving end of the through-beam photoelectric sensor are each located on one side of a moving direction of the movable mounting plate, a detection beam emitted from the through-beam photoelectric sensor is used for detecting a placing state of the clamping jaw placing assembly and/or a placing state of the sucker placing assembly, and at least one of the emitting end and the receiving end is drivingly connected to the driving element so as to be driven by the driving element to avoid the mounting plate during the movement of the mounting plate.

By arranging the through-beam photoelectric sensor and determining whether the detection beam emitted from the through-beam photoelectric sensor is blocked, on the one hand, it can be used for judging whether the jaw teeth and the sucker are respectively placed on the clamping jaw placing assembly and the sucker placing assembly, so that during the movement of the tray set, the jaw teeth and the sucker can stop moving in time while falling off; and on the other hand, it is convenient to stop moving in time when foreign matters fall onto the clamping jaw placing assembly and the sucker placing assembly.

In some embodiments, the sucker placing assembly is arranged above the mounting plate, so that the sucker can be naturally placed on the sucker placing assembly under the action of gravity after being unlocked from the battery module transport apparatus;

and/or the clamping jaw placing assembly is arranged above the mounting plate, so that the jaw teeth can be naturally placed on the clamping jaw placing assembly under the action of gravity after being unlocked from the battery module transport apparatus.

In some embodiments, the tray assembly comprises a first locking structure, the first locking structure is arranged on the support plate and provided with a movable first lock head, the movable mounting plate is provided with a first stop block, and the first locking structure has a first locked state and a first unlocked state;

in the first locked state, the first lock head is capable of forming stop fit with the first stop block along the moving direction of the mounting plate to limit the movement of the mounting plate; and in the first unlocked state, in the projection along the moving direction of the mounting plate, the projection of the first lock head is separated from the projection of the first stop block, so as to enable the mounting plate to move.

In this way, by converting the first locking structure between the first locked state and the first unlocked state, the locking of the position of the mounting plate is achieved, which is beneficial for achieving the purpose of stabilizing the mounting plate in the position of the first locked state, thus being convenient to pick and place the jaw teeth and the sucker, reducing the probability of the battery module transport apparatus being unable to determine the positions of picking and placing the jaw teeth and the sucker due to the movement of the mounting plate, and simultaneously reducing the potential safety hazards caused by the movement of the mounting plate in the process of picking and placing the jaw teeth and the sucker by the staff.

In some embodiments, the movable mounting plate is configured with two first locking structures correspondingly; in the third pick-and-place state, one of the first locking structures is in the first locked state; in the fourth pick-and-place state, the other first locking structure is in the first locked state; and the two first locking structures in the first locked state have opposite stop directions relative to the mounting plate. In this way, by alternately converting two first locking structures with opposite stop directions between the first locked state and the first unlocked state, the mounting plate is limited in both orientations along the moving direction thereof to respectively limit the moving range of the mounting plate in the third pick-and-place state and the fourth pick-and-place state, thus facilitating the operation.

In some embodiments, the support plate is provided with at least two first limiting blocks; the two first limiting blocks are arranged at an interval along the moving direction of the mounting plate to form stop fit with the mounting plate along the moving direction thereof; and in the first locked state, the stop direction of the first lock head and the first stop block is opposite to the stop direction of one of the first limiting blocks. In this way, the first limiting block and the first locking structure simultaneously limit the mounting plate in both orientations of the moving direction thereof, thus achieving the purpose of fixing the positions of the mounting plate in the third pick-and-place state and the fourth pick-and-place state.

In some embodiments, the first locking structure is a pneumatic elbow clamp, and a pressure head of the first locking structure forms the first lock head. In this way, by using the pneumatic elbow clamp as the first locking structure, the stability of the position of the first lock head in the first locked state can be improved, and the probability of locking failure caused by the first stop block exerting an acting force on the first lock head is reduced. Moreover, the use of the pneumatic elbow clamp is beneficial for achieving the automation of the operation of the quick-change platform and improving the working efficiency.

In some embodiments, the first locking structure comprises a first mounting element, a first elastic element and a first push rod, the first mounting element is arranged on the support plate, an end of the first elastic element along the extension/retraction direction thereof abuts against the first mounting element, the other end abuts against the first push rod to drive the first push rod to extend and retract, and an end of the first push rod away from the first elastic element is provided with the first lock head. In this way, the first retractable element is configured to drive the first lock head to move, thus achieving the purpose of converting the first locking structure between the first locked state and the first unlocked state.

In some embodiments, one side of the first stop block along the moving direction of the mounting plate is provided with a first guide slope, the other side is provided with a first stop surface, and the first stop surface extends along the extension/retraction direction of the first elastic element;

in the unlocked state, the first guide slope faces the first lock head and extends along the moving direction of the mounting plate towards the direction of compressing the first elastic element, so as to enable the first guide slope to push the first push rod to compress the first elastic element during the movement of the mounting plate; and in the locked state, the first lock head is capable of forming stop fit with the first stop surface along the moving direction of the mounting plate.

In this way, the first guide slope guides and drives the first lock head to synchronously complete the conversion of the first locking structure from the first unlocked state to the first locked state during the movement of the mounting plate, thus simplifying the operation steps and improving the working efficiency.

In some embodiments, the first locking structure further comprises a first rolling element, a first deflector rod and a first mounting seat, one end of the first deflector rod is provided with a first sliding groove, the first rolling element is arranged on the first push rod and is in rotational fit with the first push rod, the first rolling element is embedded in the first sliding groove and is in stop fit with an inner wall of the first sliding groove along the extension/retraction direction of the first elastic element, the first mounting seat is arranged on the support plate, the first deflector rod is rotationally connected to the first mounting seat and has a rotation axis perpendicular to the extension/retraction direction of the first elastic element, the first sliding groove extends perpendicular to the rotation axis of the first deflector rod, and the first rolling element is capable of moving relative to the first deflector rod along the extending direction of the first sliding groove, so that the rotation of the first deflector rod is capable of driving the first elastic element to extend and retract; in this way, the rotation of the first deflector rod is converted into linear motion, thus achieving the purpose of driving the first push rod; moreover, the rolling of the first rolling element can effectively reduce the friction force between the first rolling element and the inner wall of the first sliding groove, thus reducing the wear and prolonging the service life;

and/or, an end of the first push rod away from the first elastic element is provided with a second rolling element, the second rolling element is rotationally connected to the first push rod and forms the first lock head, and the friction between the second rolling element and the first stop block is rolling friction, thus effectively reducing the friction force between the second rolling element and the first stop block, reducing the wear between the second rolling element and the first stop block, and prolonging the service life of the second rolling element and the first stop block.

In some embodiments, the sucker placing assembly comprises a placing plate and positioning pins, the placing plate is arranged on the tray assembly for placing the sucker, and the positioning pins are arranged on one side of the placing plate and extend perpendicular to the thickness direction of the placing plate for insertion into the sucker. In this way, by arranging the placing plate and the positioning pins, the positioning of the sucker on the sucker placing assembly is achieved, and it is convenient to pick and place as well as transport the sucker together with the sucker placing assembly, thus improving the working efficiency.

In some embodiments, the positioning pins comprise two first positioning pins and two second positioning pins, an end of the first positioning pin away from the placing plate is conical and is higher than the second positioning pin, the first positioning pins are spaced apart from one of the second positioning pins along a first direction and spaced apart from the other second positioning pin along a second direction, and the first direction is orthogonal to the second direction. In this way, through the guiding role of the first positioning pin, the probability of damage to the positioning pin and the sucker caused by collision is reduced. Moreover, the requirement for repeated positioning accuracy between the battery module transport apparatus and the quick-change platform in the process of placing the sucker is reduced.

In some embodiments, the clamping jaw placing assembly comprises a contour support block and a floating assembly, the floating assembly is arranged on the tray assembly and has a floating end, the contour support block is arranged on the floating end and is configured to receive the jaw teeth, and the floating end is configured to move in a case that the jaw teeth push the contour support block, and return to an initial position after the pushing force is eliminated.

In this way, on the one hand, by arranging the contour support block, it is beneficial for maintaining the stability during the movement of the jaw teeth on the quick-change platform, and it is beneficial for reducing the contact pressure between the jaw teeth and the clamping jaw placing assembly; and on the other hand, the floating assembly can play a role in buffering the collision between the jaw teeth and the contour support block by floating, improve the adaptability to the position deviation between the jaw teeth and the contour support block in the process of placing the jaw teeth, and reduce the requirement for the repeated positioning accuracy between the battery module transport apparatus and the quick-change platform in the process of placing the jaw teeth.

In some embodiments, the floating assembly comprises a first mounting block, a second mounting block, at least two first chock blocks, at least two second chock blocks, first retractable elements, second retractable elements and a floating block, the first mounting block is arranged on the tray assembly, the second mounting block is arranged on the first mounting block and is in sliding fit along a third direction, the first chock blocks are arranged on both sides of the first mounting block along the third direction and are arranged at an interval, the first retractable element is clamped between the first chock blocks and the second mounting block and capable of elastically extending and retracting along the third direction, the floating block is arranged on the second mounting block and is in sliding fit along a fourth direction, the second chock blocks are arranged on both sides of the floating block along the fourth direction and are arranged at an interval, the second retractable element is clamped between the second chock blocks and the floating block and capable of elastically extending and retracting along the fourth direction, the floating block forms the floating end, and the third direction is orthogonal to the fourth direction.

In this way, by the extension and retractage of the first retractable element and the second retractable element, it is beneficial for playing a role in buffering the impact caused by placing the jaw teeth on the contour support block, improving the adaptability to the position deviation between the jaw teeth and the contour support block in the process of placing the jaw teeth, reducing the requirement for the repeated positioning accuracy between the battery module transport apparatus and the quick-change platform in the process of placing the jaw teeth, reducing the probability of the battery module transport apparatus getting stuck in the process of picking and placing the jaw teeth, and reducing the requirement for the debugging accuracy.

In some embodiments, the contour support block is provided with third positioning pins for insertion into the jaw teeth, the clamping jaw placing assembly comprises a pushing element, the pushing element has a pushing end capable of extending and retracting towards the contour support block, and the extension/retraction direction thereof intersects with the extending direction of the third positioning pin, and the pushing end is configured to abut against the jaw teeth placed on the contour support block. In this way, by suppressing the moving trend of the jaw teeth on the contour support block through the friction force, the stability of the jaw teeth on the contour support block is improved. Moreover, in the process of separating the battery module transport apparatus from the jaw teeth, the trend of removing the jaw teeth from the contour support block due to the movement of the battery module transport apparatus is suppressed.

In some embodiments, the quick-change platform comprises a frame, both the driving set and the tray set are arranged on the frame, and the tray set is in sliding fit with the frame. The frame is configured to carry the driving set and the tray set, and provides stable mounting positions for the driving set and the tray set, thus reducing the adverse effects of the ground vibration on the operation of the driving set and the tray set. The frame supports the tray set, thus reducing the load on the driving set.

In some embodiments, the quick-change platform comprises a second locking structure and a second stop block, the second locking structure is arranged on one of the frame and the tray set, the second stop block is arranged on the other one, the second locking structure is provided with a movable second lock head and has a second locked state and a second unlocked state;

in the second locked state, the second lock head is capable of forming stop fit with the second stop block along the moving direction of the tray set to limit the movement of the tray set; and in the second unlocked state, in the projection along the moving direction of the tray set, the projection of the second lock head is separated from the projection of the second stop block, so as to enable the tray set to move.

In this way, by converting the second locking structure between the second locked state and the second unlocked state, the further locking of the position of the driving set is achieved, which is beneficial for achieving the purpose of stabilizing the driving set in the position of the second locked state, thus being convenient to pick and place the jaw teeth and the sucker, reducing the probability of the battery module transport apparatus being unable to determine the positions of picking and placing the jaw teeth and the sucker due to the movement of the tray set, and simultaneously reducing the potential safety hazards caused by the movement of the tray set in the process of picking and placing the jaw teeth and the sucker by the staff.

In some embodiments, the tray set is configured with two second locking structures correspondingly; in the first pick-and-place state, one of the second locking structures is in the second locked state; in the second pick-and-place state, the other second locking structure is in the second locked state; and the two second locking structures in the second locked state have opposite stop directions relative to the tray set.

In this way, by alternately converting two second locking structures with opposite stop directions between the second locked state and the second unlocked state, the tray set is limited in both orientations along the moving direction thereof to respectively limit the moving range of the tray set in the first pick-and-place state and the second pick-and-place state, thus facilitating the operation.

In some embodiments, the frame is provided with at least two second limiting blocks; the two second limiting blocks are arranged at an interval along the moving direction of the tray set to form stop fit with the tray set along the moving direction thereof; and in the second locked state, the stop direction of the second lock head and the second stop block is opposite to the stop direction of one of the second limiting blocks. In this way, the second limiting block and the second locking structure simultaneously limit the tray set in both orientations along the moving direction thereof, thus achieving the purpose of fixing the positions of the tray set in the first pick-and-place state and the second pick-and-place state.

In some embodiments, the second locking structure is a pneumatic elbow clamp and is arranged on the frame, and a pressure head of the second locking structure forms the second lock head. In this way, by using the pneumatic elbow clamp as the second locking structure, the stability of the position of the second lock head in the second locked state can be improved, and the probability of locking failure caused by the second stop block exerting an acting force on the second lock head is reduced. Moreover, the use of the pneumatic elbow clamp is beneficial for achieving the automation of the operation of the quick-change platform and improving the working efficiency.

In some embodiments, the second locking structure comprises a second mounting element, a second elastic element and a second push rod, the second mounting element is arranged on the tray set, one end of the second elastic element along the extension/retraction direction thereof abuts against the second mounting element, the other end abuts against the second push rod to drive the second push rod to extend and retract, and an end of the second push rod away from the second elastic element is provided with the second lock head. In this way, the second retractable element is configured to drive the second lock head to move, thus achieving the purpose of converting the second locking structure between the second locked state and the second unlocked state.

In some embodiments, one side of the second stop block along the moving direction of the tray set is provided with a second guide slope, the other side is provided with a second stop surface, and the second stop surface extends along the extension/retraction direction of the second elastic element;

in the unlocked state, the second guide slope faces the second lock head and extends along the moving direction of the tray set towards the direction of compressing the second elastic element, so as to enable the second guide slope to push the second push rod to compress the second elastic element during the movement of the tray set; and in the locked state, the second lock head is capable of forming stop fit with the second stop surface along the moving direction of the tray set.

In this way, the second guide slope guides and drives the second lock head to synchronously complete the conversion of the second locking structure from the second unlocked state to the second locked state during the movement of the tray set, thus simplifying the operation steps and improving the working efficiency.

In some embodiments, the second locking structure further comprises a third rolling element, a second deflector rod and a second mounting seat, one end of the second deflector rod is provided with a second sliding groove, the third rolling element is arranged on the second push rod and is in rotational fit with the second push rod, the third rolling element is embedded in the second sliding groove and is in stop fit with an inner wall of the second sliding groove along the extension/retraction direction of the second elastic element, the second mounting seat is arranged on the tray set, the second deflector rod is rotationally connected to the second mounting seat and has a rotation axis perpendicular to the extension/retraction direction of the second elastic element, the second sliding groove extends perpendicular to the rotation axis of the second deflector rod, and the third rolling element is capable of moving relative to the second deflector rod along the extending direction of the second sliding groove, so that the rotation of the second deflector rod is capable of driving the second elastic element to extend and retract; in this way, the rotation of the second deflector rod is converted into linear motion, thus achieving the purpose of driving the second push rod; moreover, the rolling of the third rolling element can effectively reduce the friction force between the third rolling element and the inner wall of the second sliding groove, thus reducing the wear and prolonging the service life;

and/or, an end of the second push rod away from the second elastic element is provided with a fourth rolling element, the fourth rolling element is rotationally connected to the second push rod and forms the second lock head, and the friction between the fourth rolling element and the second stop block is rolling friction, thus effectively reducing the friction force between the fourth rolling element and the second stop block, reducing the wear between the fourth rolling element and the second stop block, and prolonging the service life of the fourth rolling element and the second stop block.

An embodiment of the present disclosure further provides a battery production line. The battery production line includes:

- a first conveying apparatus for conveying a battery module;
- a second conveying apparatus for conveying a battery case;
- a battery module transport apparatus, provided with a detachable sucker and a plurality of detachable jaw teeth, wherein the plurality of jaw teeth are configured to clamp the battery module, and the sucker is configured to adsorb the battery module, so that the battery module transport apparatus is configured to place the battery module into the battery case; and
- at least two quick-change platforms according to any one of the above embodiments, wherein at least one of the quick-change platforms is configured to place the jaw teeth and/or the sucker detached from the battery module transport apparatus, and at least one of the quick-change platforms is configured to place the jaw teeth and/or the sucker to be replaced.

In this way, by arranging a plurality of quick-change platforms in the battery production line, the picking and placing operations performed by the battery module transport apparatus and the picking and placing operations performed by the staff can be performed synchronously, that is, the operation times are overlapped, thus reducing the total operation time and improving the working efficiency.

An embodiment of the present disclosure further provides a control method for controlling the replacement of jaw teeth and a sucker in a battery production line. The control method includes:

determining step: determining that a tray set of one quick-change platform is in an empty state, and determining that the jaw teeth and sucker placed on the other quick-change platform have target models;

positioning step: determining that both quick-change platforms are in a first pick-and-place state;

separation step: driving a battery module transport apparatus to move to a preset detaching position, controlling the jaw teeth and the sucker on the battery module transport apparatus to be detached, and receiving the jaw teeth and the sucker by the tray set of the quick-change platform in an empty state; and mounting step: driving the battery module transport apparatus to move to a preset mounting position, and controlling the battery module transport apparatus to connect with the jaw teeth and the sucker on the other quick-change platform.

In this way, according to the control method, the cooperation between two quick-change platforms is achieved, the velocity of replacing the jaw teeth and the sucker by the battery module transport apparatus is increased, and the efficiency of production switching in the battery production line is improved.

In some embodiments, before the determining step, the control method further includes:

controlling a second locking structure of one of the quick-change platforms to be in a second unlocked state;

controlling the quick-change platform to be converted to a second pick-and-place state, and controlling the corresponding second locking structure to be in a second locked state;

controlling a first locking structure to be in a first unlocked state, controlling a movable mounting plate to be in a fourth pick-and-place state, and controlling the corresponding first locking structure to be in a first locked state;

placing the jaw teeth of the target model on a clamping jaw placing assembly, and placing the sucker of the target model on a sucker placing assembly; and controlling the first locking structure to be in a first unlocked state, controlling the movable mounting plate to be in a third pick-and-place state, and controlling the corresponding first locking structure to be in a first locked state.

In this way, the purpose of connecting the jaw teeth of the target model and the sucker of the target model by the battery module transport apparatus is achieved. By controlling the first locking structure to be converted between the first locked state and the first unlocked state, the purpose of placing the jaw teeth and sucker of the target models on the quick-change platform is achieved, and it is beneficial for maintaining the stability during placement.

In some embodiments, the controlling a second locking structure of one of the quick-change platforms to be in a second unlocked state specifically includes:

driving a second deflector rod to rotate to enable an inner wall of a second sliding groove to abut against a third rolling element, and driving a second push rod to move towards a direction away from a second stop block until the projection of a second lock head is separated from the second stop block in the projection along the moving direction of the tray set.

In this way, the second locking structure can be converted to the second unlocked state in the manner of driving the second deflector rod, the steps are simple and intuitive, and it is convenient for the staff to operate.

In some embodiments, the controlling a first locking structure to be in a first unlocked state specifically includes:

driving a first deflector rod to rotate to enable an inner wall of a first sliding groove to abut against a first rolling element, and driving a first push rod to move towards a direction away from a first stop block until the projection of a first lock head is separated from the first stop block in the projection along the moving direction of the tray set.

In this way, the first locking structure can be converted to the first unlocked state in the manner of driving the first deflector rod, the steps are simple and intuitive, and it is convenient for the staff to operate.

In some embodiments, before the controlling the movable mounting plate to be in a third pick-and-place state, the control method further includes:
controlling a driving element to drive part of a through-beam photoelectric sensor located on a moving path of the mounting plate to move, so as to enable the through-beam photoelectric sensor to avoid the mounting plate.

In this way, the interference generated by the through-beam photoelectric sensor on the movement of the mounting plate is avoided, and the probability of damage to the through-beam photoelectric sensor and the mounting plate caused by collision is reduced.

In some embodiments, after the separation step, the control method further includes:
controlling the second locking structure of the quick-change platform on which the old jaw teeth and sucker are placed to be in a second unlocked state;
controlling the quick-change platform to be in a second pick-and-place state, and controlling the corresponding second locking structure to be in a second locked state;
controlling the first locking structure of the tray set to be in a first unlocked state, controlling the movable mounting plate to be in a fourth pick-and-place state, and controlling the corresponding first locking structure to be in a first locked state; and
removing the old jaw teeth from the clamping jaw placing assembly, and removing the old sucker from the sucker placing assembly.

In this way, the process of transporting the jaw teeth and sucker of old models does not interfere with the normal work of the battery module transport apparatus, thus improving the production efficiency.

In some embodiments, before the driving the battery module transport apparatus to move to a preset mounting position, the control method further includes:
controlling a pushing end of a pushing element to move to a position abutting against the jaw teeth.

In this way, the pushing element abuts against the jaw teeth; on the one hand, it is beneficial for maintaining the stability of the jaw teeth on the quick-change platform, and reducing the probability of the jaw teeth falling off; and on the other hand, in the process of separating the battery module transport apparatus from the jaw teeth, it is beneficial for suppressing the trend of removing the jaw teeth from the contour support block due to the movement of the battery module transport apparatus.

Figure 1:
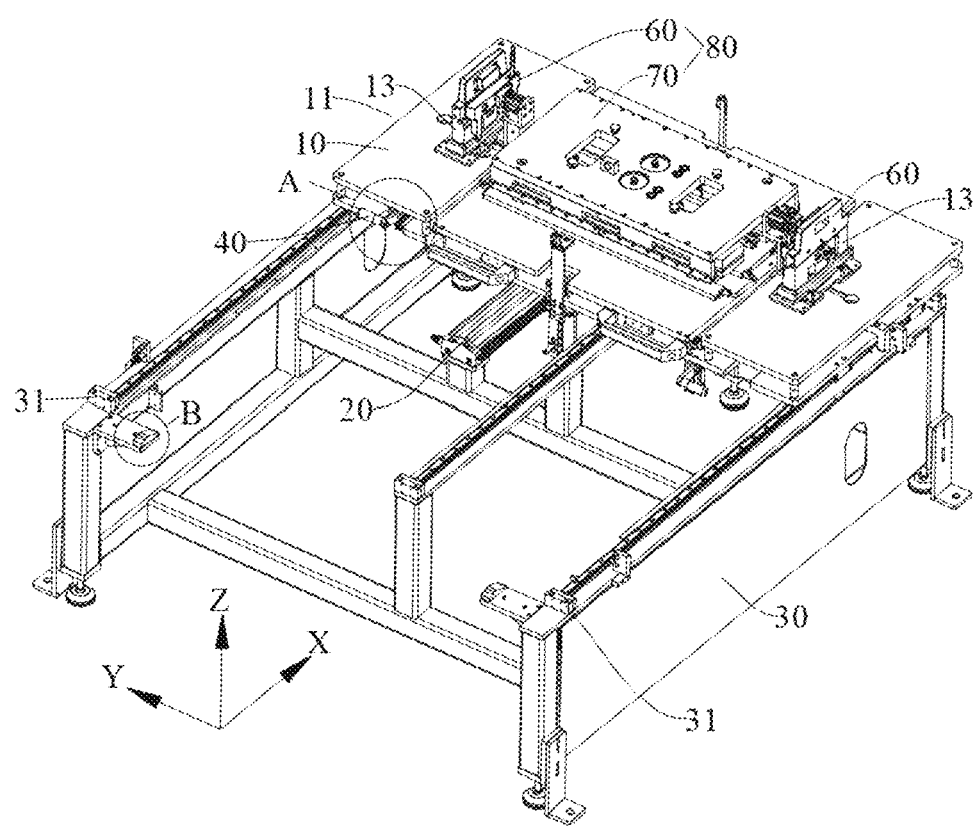
FIG. 1 is a schematic diagram of a quick-change platform, jaw teeth and a sucker in an embodiment of the present disclosure.

DESCRIPTION OF REFERENCE NUMERALS tray set 10;
tray assembly 11;
support plate 111;
avoidance hole 111*a*;
first limiting block 1111;
mounting plate 112;
first stop block 1121;
first guide slope 1121*a*;
first stop surface 1121*b*;
pushing handle 1122;
sucker placing assembly 12;
placing plate 121;
positioning pin 122;
first positioning pin 1221;
second positioning pin 1222;
transport handle 1223;
clamping jaw placing assembly 13;
contour support block 131;
floating assembly 132;
floating end 132*a*;
first mounting block 1321;
second mounting block 1322;
first chock block 1323;
second chock block 1324;
first retractable element 1325;
second retractable element 1326;
floating block 1327;
third positioning pin 133;
pushing element 134;
pushing end 134*a*;
detection assembly 14;
through-beam photoelectric sensor 141;
driving element 142;
first locking structure 15;
first lock head 15*a*;
first mounting element 151;
first elastic element 152;
first push rod 153;
first rolling element 154;
first deflector rod 155;
first sliding groove 155*a*;

first mounting seat 156;
second rolling element 157;
driving set 20;
frame 30;
second limiting block 31;
second locking structure 40;
second lock head 40a;
second mounting element 41;
second elastic element 42;
second push rod 43;
third rolling element 44;
second deflector rod 45;
second sliding groove 45a;
second mounting seat 46;
fourth rolling element 47;
second stop block 50;
second guide slope 50a;
second stop surface 50b;
jaw teeth 60;
sucker 70;
target object 80.

DETAILED DESCRIPTION

It should be noted that in the case of no conflict, the embodiments in the present disclosure and the technical features in the embodiments may be combined with each other. The detailed descriptions in the specific embodiments should be understood as an explanation of the purpose of the present disclosure, and should not be regarded as an improper limitation on the present disclosure.

Unless otherwise defined, all technical and scientific terms used herein have the same meanings as commonly understood by those skilled in the art in the present application. The terms used herein are intended only for the purpose of describing specific embodiments and are not intended to limit the present disclosure. The terms "including" and "having" and any variants thereof in the specification of the present disclosure and in the description of drawings above are intended to cover non-exclusive inclusion.

At present, the applications of new energy batteries in daily life and industries are becoming increasingly widespread. New energy batteries are used in energy storage power source systems such as hydraulic, thermal, wind and solar power stations, as well as in multiple fields such as electric vehicles including electric bicycles, electric motorcycles, electric cars and the like, aerospace, and the like.

In the embodiments of the present disclosure, a battery may be a battery cell. The battery cell refers to a basic unit that can achieve mutual conversion between chemical energy and electric energy, and can be configured to make a battery module or a battery pack, thereby supplying power to an electrical apparatus. The battery cell may be a secondary battery, and the secondary battery refers to a battery cell that can be used continually by activating an active material in the manner of charging after the battery cell is discharged. The battery cell may be a lithium-ion battery, a sodium-ion battery, a sodium/lithium-ion battery, a lithium metal battery, a sodium metal battery, a lithium-sulfur battery, a magnesium-ion battery, a nickel-hydrogen battery, a nickel-cadmium battery, a lead storage battery, or the like, which is not limited in the embodiments of the present disclosure.

The battery cell generally includes an electrode assembly. The electrode assembly includes a positive electrode, a negative electrode and a spacer. During charging and discharging of the battery cell, active ions (such as lithium ions) are intercalated and deintercalated back and forth between the positive electrode and the negative electrode. The spacer is arranged between the positive electrode and the negative electrode, and may play a role in preventing a short circuit between the positive electrode and the negative electrode while allowing active ions to pass through.

In some embodiments, the battery cell further includes an electrolyte, and the electrolyte plays a role in conducting ions between the positive electrode and the negative electrode. The type of the electrolyte is not specifically limited in the present disclosure, and may be selected according to needs. The electrolyte may be in a liquid state, a gel state or a solid state.

In some embodiments, the battery cell may include a shell. The shell is configured to encapsulate components, such as the electrode assembly and the electrolyte. The shell may be a steel shell, an aluminum shell, a plastic shell (such as polypropylene), a composite metal shell (such as a copper-aluminum composite shell), an aluminum-plastic film, or the like.

As an example, the battery cell may be a cylindrical battery cell, a prismatic battery cell, a pouch cell, or a battery cell in another shape. The prismatic battery cell includes a square battery cell, a blade battery cell, and a multi-prism battery. For example, the multi-prism battery may be a hexagonal prism battery, or the like, which is not specifically limited in the present disclosure.

In some embodiments, the shell includes an end cover and a case, the case is provided with an opening, and the end cover closes the opening to form a closed space for accommodating substances such as the electrode assembly and the electrolyte. The case may be provided with one or a plurality of openings. One or a plurality of end covers may also be provided.

In some embodiments, the shell is provided with at least one electrode terminal, and the electrode terminal is electrically connected to a tab. The electrode terminal may be directly connected to the tab, or may also be indirectly connected to the tab through an adapter. The electrode terminal may be arranged on the end cover, or may also be arranged on the case. In some embodiments, the shell is provided with a pressure relief mechanism. The pressure relief mechanism is configured to release the internal pressure of the battery cell.

In the embodiments of the present disclosure, the battery may also be a single physical module including one or a plurality of battery cells to provide a higher voltage and capacity (such as a battery module or a battery pack). When a plurality of battery cells are provided, the plurality of battery cells are connected in series, in parallel or in parallel-series connection through bus components.

In the description of the embodiments of the present disclosure, the technical terms "first", "second", "third", and the like are only used for distinguishing different objects, and cannot be understood as indicating or implying a relative importance or implicitly specifying the number, particular order, or primary and secondary relation of the technical features indicated. In the description of the embodiments of the present disclosure, "a plurality of" means two or more, unless otherwise explicitly and specifically defined.

The reference to "embodiments" herein means that specific features, structures or characteristics described in combination with the embodiments may be included in at least one embodiment of the present disclosure. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present disclosure, the term "and/or" is only an association relationship for describing associated objects, indicating that three relationships may exist. For example, A and/or B may indicate three situations: A exists alone, both A and B exist, and B exists alone. In addition, the character "/" herein generally means that the associated objects before and after it are in an "or" relationship.

In the description of the embodiments of the present disclosure, for ease of explanation, as indicated by arrows in FIG. 1, the direction of the arrow X is taken as a first direction and a fourth direction, the direction of the arrow Y is taken as a second direction and a third direction, the direction of the arrow Z is taken as a vertical direction, the direction indicated by the arrow Z along the vertical direction is referred to as "up", and the opposite direction is referred to as "down".

In the description of the embodiments of the present disclosure, unless otherwise explicitly specified and defined, the technical terms such as "mount", "connect", "connection" and "fix" should be understood in a broad sense. For example, the connection may be fixed connection, detachable connection or integrated connection, may be mechanical connection or electrical connection, or may be direct connection, indirect connection through an intermediate, internal communication between two elements or interaction relationship between two elements. For those of ordinary skill in the art, the specific meanings of the above terms in the embodiments of the present disclosure can be understood according to specific situations.

In the description of the embodiments of the present disclosure, unless otherwise explicitly specified and defined, the technical term "contact" should be understood in a broad sense, which may be direct contact, or contact through an intermediate layer, or contact between two objects that have little or no interaction force, or contact between two objects that have interaction force.

The embodiments of the present disclosure will be described in detail below.

Jaw teeth and a sucker of a battery module transport apparatus are both arranged detachably. In the process of replacing the jaw teeth and the sucker manually, the staff needs to first remove the original jaw teeth and sucker from the battery module transport apparatus and then mount new claw teeth and sucker. In this process, the transport and alignment of materials require a lot of time, and the jaw teeth and the sucker are heavier, which is not beneficial for transporting and adjusting positions and orientations, and there are certain safety risks during the operation of the staff.

An embodiment of the present disclosure aims to provide a quick-change platform. Workpieces needing to be replaced on the battery module transport apparatus are placed on the quick-change platform in advance, or old workpieces removed from the battery module transport apparatus are placed on the quick-change platform. In this way, through the cooperation between a plurality of quick-change platforms, the steps of placing new workpieces and removing old workpieces can be performed synchronously, thus saving the working time.

For example, two quick-change platforms are arranged, new workpieces needing to be replaced on the battery module transport apparatus are placed on one of the quick-change platforms, at the same time, the old workpieces are placed on the other quick-change platform by the battery module transport apparatus, and then, the new workpieces are mounted on the previous quick-change platform by the battery module transport apparatus, thus achieving the rapid replacement of the workpiece type.

Figure 2:
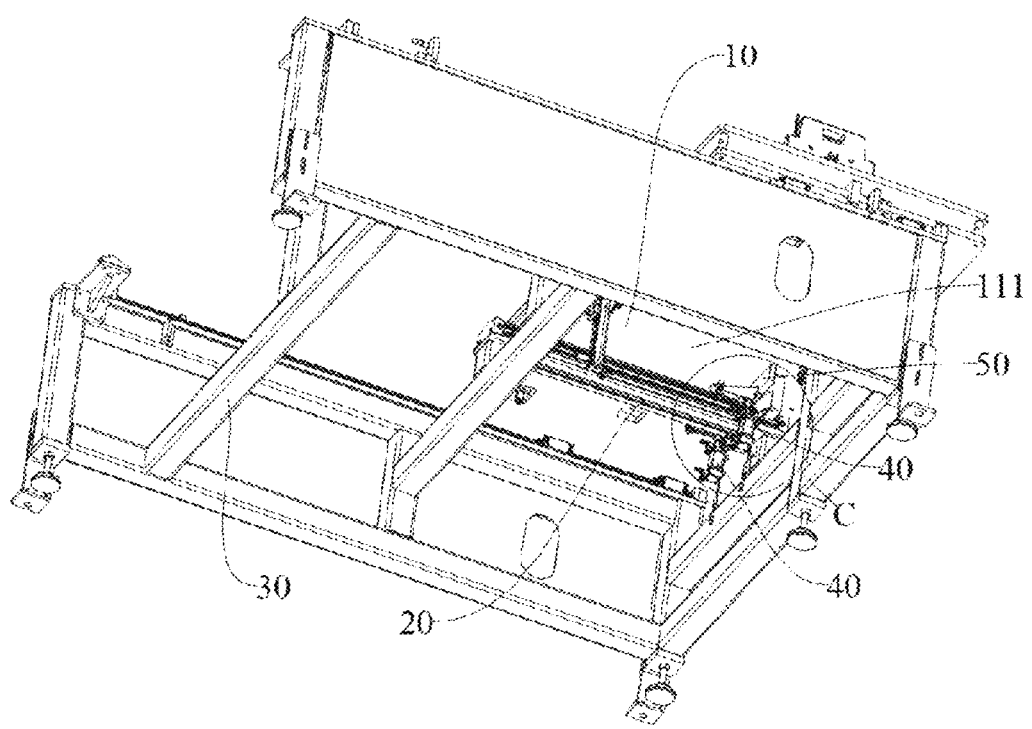
FIG. 2 is a schematic diagram of the embodiment in FIG. 1 from another perspective.

Specifically, an embodiment of the present disclosure provides a quick-change platform for placing a target object 80 for a battery module transport apparatus. Referring to FIG. 1 and FIG. 2, the quick-change platform includes a tray set 10.

The tray set 10 is movable.

The quick-change platform has a first pick-and-place state and a second pick-and-place state;

in the first pick-and-place state, the tray set 10 is located in a first pick-and-place position, so as to enable the tray set 10 to receive the target object 80 removed from the battery module clamp, or enable the battery module transport apparatus to pick the target object 80 placed on the tray set 10; and in the second pick-and-place state, the tray set 10 is located in a second pick-and-place position, so as to remove the target object 80 on the tray set 10, or place the target object 80 on the tray set 10.

The tray set 10 is movable, that is, the position of the tray set 10 can be changed by moving.

The target object 80 refers to a workpiece that needs to be dismounted and replaced from the battery module transport apparatus in order to meet the production requirements of different types of battery modules.

In the first pick-and-place state, the tray set 10 is located in the first pick-and-place position, so that the jaw teeth 60 and sucker 70 of old models on the battery module transport apparatus can be separated and then placed on the tray set 10, or the battery module transport apparatus is connected to the jaw teeth 60 and sucker 70 of new models placed on the tray set 10.

In the second pick-and-place state, the tray set 10 is located in the second pick-and-place position, so that the staff can transport and warehouse the jaw teeth 60 and sucker 70 of old models removed from the battery module transport apparatus on the tray set 10, or place the jaw teeth 60 and sucker 70 of new models on the tray set 10.

According to the quick-change platform in the embodiment of the present disclosure, by switching the tray set 10 between the first pick-and-place position and the second pick-and-place position, the positions of picking and placing the target object 80 by the battery module transport apparatus are different from the positions of picking and placing the target object 80 by the staff. In this way, on the one hand, the probability of interference between the process of performing the picking and placing operations by the battery module transport apparatus and the process of performing the picking and placing operations by the staff is reduced, and the operation safety is improved; and on the other hand, by arranging a plurality of quick-change platforms, the picking and placing operations performed by the battery module transport apparatus and the picking and placing operations performed by the staff can be performed synchronously, that is, the operation times are overlapped, thus reducing the total operation time and improving the production efficiency.

Quick-change platforms in some embodiments of the present disclosure are described in detail below.

In some embodiments, the target object 80 carried by the tray set 10 is the jaw teeth 60; and/or the target object 80 carried by the tray set 10 is the sucker 70.

That is, the quick-change platform may only be configured to place the jaw teeth 60 on the battery module transport apparatus, or may only be configured to place the sucker 70 on the battery module transport apparatus, or may also be configured to place the jaw teeth 60 and sucker 70 on the battery module transport apparatus at the same time.

In this way, the applicability of the tray set 10 is improved.

In some embodiments, referring to FIG. 1 and FIG. 2, the quick-change platform includes a driving set 20, and a driving end of the driving set 20 is drivingly connected to the tray set 10 to drive the tray set 10 to move between the first pick-and-place position and the second pick-and-place position.

The specific type of the driving set 20 is not limited, such as a synchronous belt linear module, a ball screw linear module, a linear motor, a slide cylinder, a rodless cylinder, or a six-axis robot.

The driving end of the driving set 20 refers to a part of the driving set 20 that can be driven to move relative to other parts of the driving set 20. For example, in a case that the driving set 20 is a rodless cylinder, the driving end is a sliding table.

Through the movement of the driving end of the driving set 20, the tray set 10 at least can move between two positions. The two positions are the first pick-and-place position and the second pick-and-place position.

In this way, it is beneficial for achieving automatic control of the movement of the tray set 10.

It can be understood that the battery module transport apparatus needs to be provided with a plurality of jaw teeth 60, and the acting forces exerted by the jaw teeth 60 on the battery module in the process of grabbing the battery module have different directions, thus achieving the purpose of grabbing the battery module.

Figure 3:
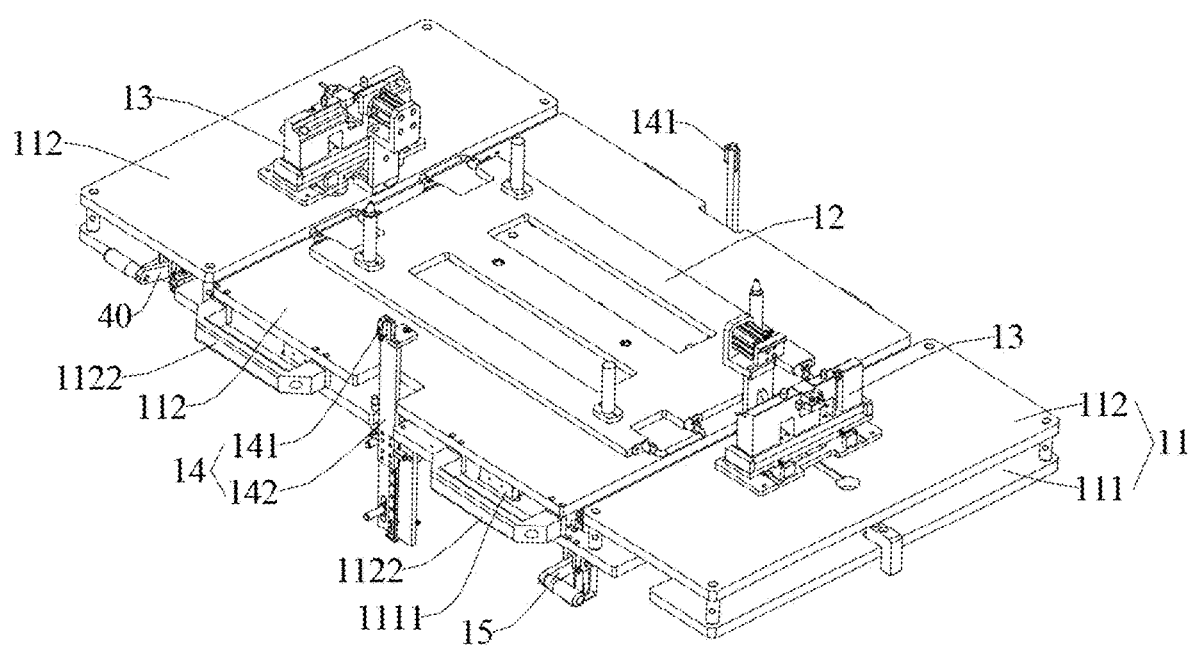
FIG. 3 is a schematic diagram of a tray set from a first perspective in an embodiment of the present disclosure.
Figure 4:
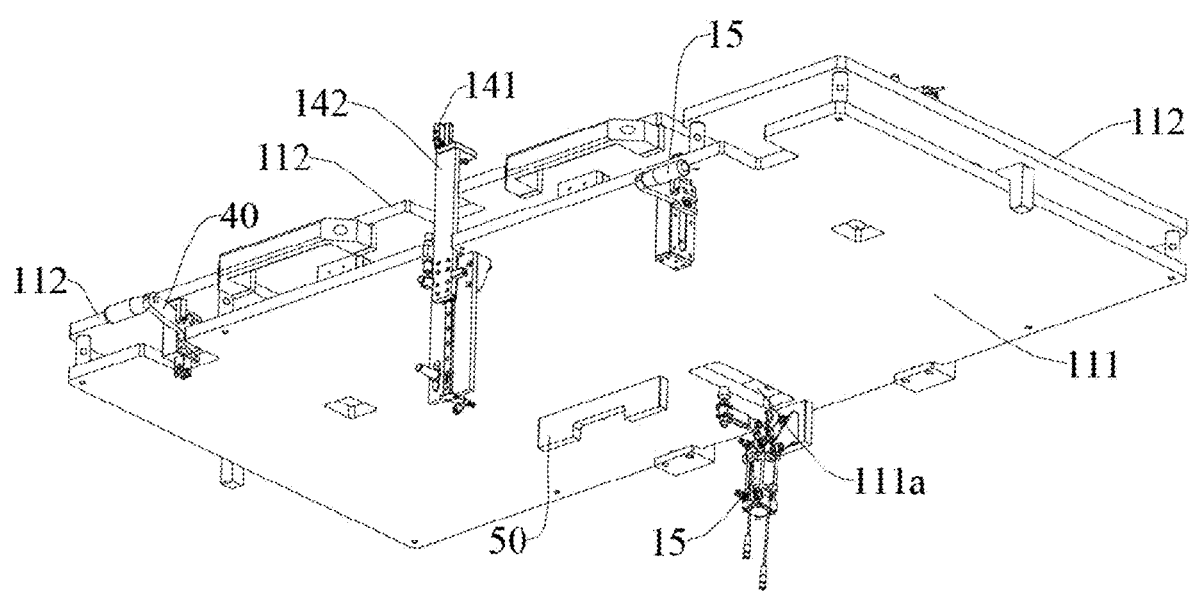
FIG. 4 is a schematic diagram of the embodiment in FIG. 3 from a second perspective.
Figure 5:
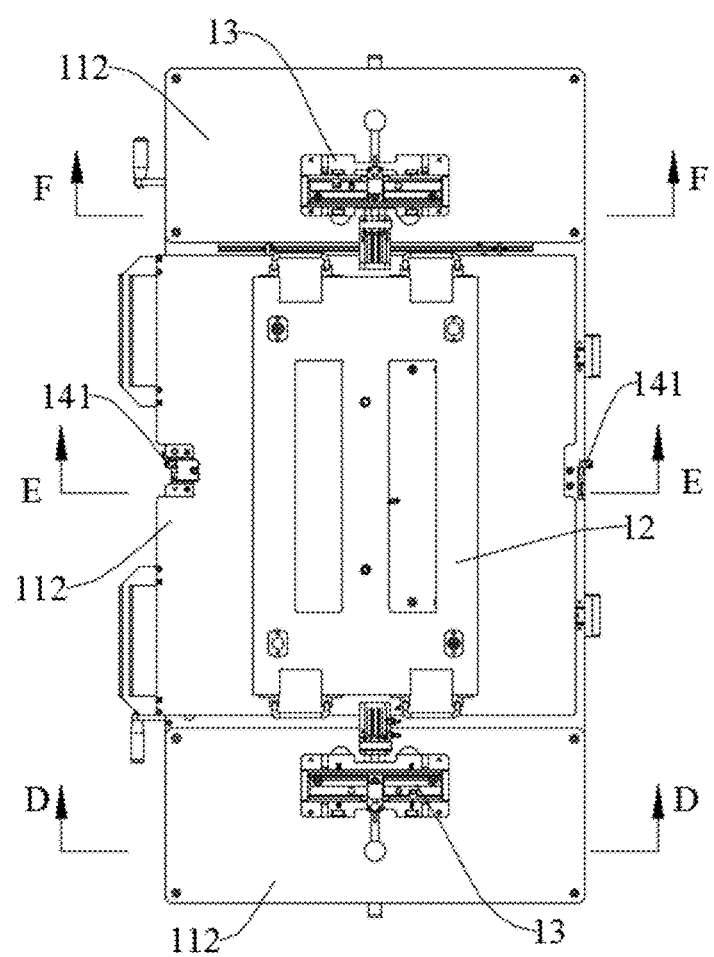
FIG. 5 is a schematic diagram of the embodiment in FIG. 3 from a third perspective.

In some embodiments, referring to FIG. 3 to FIG. 5, the tray set 10 includes a tray assembly 11, a sucker placing assembly 12 and a plurality of clamping jaw placing assemblies 13, the driving end of the driving set 20 is drivingly connected to the tray assembly 11, both the clamping jaw placing assembly 13 and the sucker placing assembly 12 are arranged on the tray assembly 11, the clamping jaw placing assembly 13 is configured to place the jaw teeth 60, and the sucker placing assembly 12 is configured to place the sucker 70.

The sucker placing assembly 12 is configured to carry the sucker 70 of the old model separated from the battery module transport apparatus, and the staff can place the sucker 70 of the new model on the sucker placing assembly 12.

The clamping jaw placing assembly 13 is configured to carry the jaw teeth 60 of the old model separated from the battery module transport apparatus, and the staff can place the jaw teeth 60 of the new model on the clamping jaw placing assembly 13.

It can be understood that there may be a plurality of clamping jaw placing assemblies 13, and each clamping jaw placing assembly 13 is configured to carry one jaw tooth 60.

The tray assembly 11 provides mounting positions for the sucker placing assembly 12 and the clamping jaw placing assembly 13, and enables the sucker placing assembly 12 and the clamping jaw placing assembly 13 to synchronously move, so as to be converted between the first pick-and-place position and the second pick-and-place position.

In this way, by arranging the sucker placing assembly 12 and the clamping jaw placing assembly 13, the jaw teeth 60 and the sucker 70 have specific placing positions on the tray set 10 respectively to facilitate the positioning of the jaw teeth 60 and the sucker 70, thus being beneficial for achieving automatic control of the quick-change platform.

It can be understood that jaw teeth 60 of different models and suckers 70 of different models have different sizes and shapes.

In some embodiments, at least one of the clamping jaw placing assembly 13 and the sucker placing assembly 12 is detachably connected to the tray assembly 11.

In this way, on the one hand, the purpose of adapting to the jaw teeth 60 and sucker 70 of the corresponding models can be achieved only by dismounting and replacing the clamping jaw placing assembly 13 and the sucker placing assembly 12, thus reducing the workload; and on the other hand, it is convenient for the staff to transport the clamping jaw placing assembly 13 and the sucker placing assembly 12 together with the jaw teeth 60 and the sucker 70 respectively, thus improving the operation convenience.

The specific manner of achieving the detachable connection is not limited. For example, the detachable connection may be achieved through the cooperation between screws and threaded holes.

The specific structural form of the tray assembly 11 is not limited.

Exemplarily, referring to FIG. 3 and FIG. 4, the tray assembly 11 includes a support plate 111 and a plurality of mounting plates 112, the mounting plates 112 are arranged on the support plate 111, at least one of the mounting plates 112 can be movable relative to the support plate 111, and the clamping jaw placing assembly 13 and the sucker placing assembly 12 respectively correspond to the mounting plate 112;

the movable mounting plate 112 has a third pick-and-place state and a fourth pick-and-place state;

in the third pick-and-place state, the mounting plate 112 moves to a third pick-and-place position, so that the target object 80 removed from the battery module transport apparatus can be received, or the battery module transport apparatus can pick the target object 80; and in the fourth pick-and-place state, the mounting plate 112 moves to a fourth pick-and-place position, so that the target object 80 on the tray set 10 can be removed, or the target object 80 can be placed on the tray set 10.

The support plate 111 is configured to provide mounting positions for other components in the tray assembly 11 and drive other components to move together.

A clamping jaw placing assembly 13 or a sucker placing assembly 12 is arranged on each mounting plate 112 respectively. The movable mounting plate 112 can drive the clamping jaw placing assembly 13 or sucker placing assembly 12 placed thereon to move.

In this way, by enabling the mounting plate 112 to move relative to the support plate 111, it is beneficial for expanding the moving range of the clamping jaw placing assembly 13 and the sucker placing assembly 12 in a case that the floor area of the quick-change platform is definite, thus further improving the convenience of performing the picking and placing operations by the staff.

For example, the quick-change platform is located in a safety barrier to reduce the potential safety hazards generated in the process of driving the tray set 10 to move by the driving set 20. In a case that the quick-change platform is in the second pick-and-place state, the movable mounting plate 112 is driven to be converted from the third pick-and-place state to the fourth pick-and-place state. In this way, the position of the mounting plate 112 in the fourth pick-and-place state is further away from the position of the mounting plate 112 in the first pick-and-place state, which is beneficial for expanding the operation space of the staff and improving the operation convenience.

It can be understood that in a case that the movable mounting plate 112 is in the third pick-and-place state, the tray set 10 is in the first pick-and-place state; and in a case that the movable mounting plate 112 is in the fourth pick-and-place state, the tray set 10 is in the second pick-and-place state.

The specific materials of the support plate 111 and the mounting plate 112 are not limited, such as stainless steel and aluminum alloy.

The specific manner of achieving the relative movement between the support plate 111 and the movable mounting plate 112 is not limited. For example, one of the support plate 111 and the movable mounting plate 112 is provided with a ball slider, the other is provided with a guide rail, and the guide rail is in sliding fit with the ball slider, thus reducing the friction force required for sliding between the support plate 111 and the mounting plate 112.

It can be understood that the driving end of the driving set 20 is drivingly connected to the support plate 111 to drive the support plate 111 to move.

In some embodiments, referring to FIG. 3, the movable mounting plate 112 is provided with a pushing handle 1122, so that the staff can achieve the purpose of pushing the mounting plate 112 to move by holding the pushing handle 1122.

In some embodiments, the moving direction of the tray set 10 driven by the driving set 20 is the same as the moving direction of the movable mounting plate 112 relative to the support plate 111. In this way, the mounting plate 112 in the fourth pick-and-place state can be better away from the battery module transport apparatus, thus improving the operation convenience of the staff.

The sucker 70 on the battery module transport apparatus is heavier and larger in size compared to the jaw teeth 60.

In some embodiments, the mounting plate 112 provided with the sucker placing assembly 12 is in sliding fit with the support plate 111. In this way, the convenience of picking and placing the sucker 70 by the staff is improved.

In some embodiments, referring to FIG. 3 and FIG. 4, the tray set 10 includes a detection assembly 14, the detection assembly 14 is arranged on the support plate 111, the detection assembly 14 includes a through-beam photoelectric sensor 141 and a driving element 142, an emitting end and a receiving end of the through-beam photoelectric sensor 141 are each located on one side of a moving direction of the movable mounting plate 112, a detection beam emitted from the through-beam photoelectric sensor 141 is used for detecting a placing state of the clamping jaw placing assembly 13 and/or a placing state of the sucker placing assembly 12, and at least one of the emitting end and the receiving end is drivingly connected to the driving element 142 so as to be driven by the driving element 142 to avoid the mounting plate 112 during the movement of the mounting plate 112.

The through-beam photoelectric sensor 141 has the emitting end and the receiving end configured in pairs. The emitting end is configured to emit a detection beam, and the receiving end is configured to sense the detection beam. The emitting end and the receiving end are arranged oppositely. In a case that an object enters between the emitting end and the receiving end and blocks the detection beam, the through-beam photoelectric sensor 141 sends a specific signal to the corresponding control apparatus, so that the control apparatus judges whether the object between the emitting end and the receiving end meets the current working condition based on the signal, so as to determine whether to continue to execute the next working step or pause the current working step.

The placing state of the clamping jaw placing assembly 13 refers to whether there is an object placed on the clamping jaw placing assembly 13.

The placing state of the sucker placing assembly 12 refers to whether there is an object placed on the sucker placing assembly 12.

By arranging the through-beam photoelectric sensor 141 and determining whether the detection beam emitted from the through-beam photoelectric sensor 141 is blocked, on the one hand, it can be used for judging whether the jaw teeth 60 and the sucker 70 are respectively placed on the clamping jaw placing assembly 13 and the sucker placing assembly 12, so that during the movement of the tray set 10, the jaw teeth 60 and the sucker 70 can stop moving in time while falling off; and on the other hand, it is convenient to stop moving in time when foreign matters fall onto the clamping jaw placing assembly 13 and the sucker placing assembly 12.

It can be understood that in a case that the mounting plate 112 is in the fourth pick-and-place state, in the projection along the moving direction of the mounting plate 112, the projections of the driving element 142 and part of the through-beam photoelectric sensor 141 drivingly connected to the driving element 142 are both located outside the projection of the mounting plate 112.

By using the driving element 142 to drive the through-beam photoelectric sensor 141, in a case that the detection function of the through-beam photoelectric sensor 141 is not affected, the interference between the through-beam photo-electric sensor 141 and the movement of the mounting plate 112 is avoided, which is beneficial for the arrangement of the through-beam photoelectric sensor 141 closer to the mounting plate 112, thus being beneficial for improving the detection accuracy of the through-beam photoelectric sensor 141.

The specific form of the driving element 142 is not limited. For example, at least one of the emitting end and the receiving end is arranged on a sliding table cooperating with a guide rail, and a driving end of a cylinder is connected to the sliding table, that is, the cylinder, the guide rail and the sliding table together form the driving element 142.

In some embodiments, referring to FIG. 1 and FIG. 3, the mounting plate 112 is located above the support plate 111 to reduce the floor area of the tray set 10 and facilitate the transmission of the mounting plate 112 and the borne gravity load onto the support plate 111.

In some embodiments, referring to FIG. 1 and FIG. 3, the sucker placing assembly 12 is arranged above the mounting plate 112. In this way, the sucker 70 can be naturally placed on the sucker placing assembly 12 under the action of gravity after being unlocked from the battery module transport apparatus.

In some embodiments, referring to FIG. 1 and FIG. 3, the clamping jaw placing assembly 13 is arranged above the mounting plate 112. In this way, the jaw teeth 60 can be naturally placed on the clamping jaw placing assembly 13 under the action of gravity after being unlocked from the battery module transport apparatus.

It can be understood that in a case that the mounting plate 112 is in the third pick-and-place state or the fourth pick-and-place state, it is necessary to limit the position of the mounting plate 112 to reduce the adverse effects on subsequent steps caused by the movement of the mounting plate 112.

In some embodiments, referring to FIG. 3 to FIG. 8, the tray assembly 11 includes a first locking structure 15, the first locking structure 15 is arranged on the support plate 111, the first locking structure 15 is provided with a movable first lock head 15a, the movable mounting plate 112 is provided with a first stop block 1121, and the first locking structure 15 has a first locked state and a first unlocked state.

In the first locked state, the first lock head 15a can be in stop fit with the first stop block 1121 along the moving direction of the mounting plate 112 to limit the movement of the mounting plate 112. That is, the first lock head 15a can abut against the first stop block 1121 along the moving direction of the mounting plate 112 to suppress the movement of the mounting plate 112, thus achieving the purpose of maintaining the mounting plate 112 in the third pick-and-place state or the fourth pick-and-place state.

In the first unlocked state, in the projection along the moving direction of the mounting plate 112, the projection of the first lock head 15a is separated from the projection of the first stop block 1121, so that the mounting plate 112 can move. That is, in the projection along the moving direction of the mounting plate 112, the projection of the first lock head 15a is not overlapped with the projection of the first stop block 1121, so that the purpose of converting the mounting plate 112 between the third pick-and-place state and the fourth pick-and-place state can be achieved by moving.

In this way, by converting the first locking structure 15 between the first locked state and the first unlocked state, the locking of the position of the mounting plate 112 is achieved, which is beneficial for achieving the purpose of stabilizing the mounting plate 112 in the position of the first locked state, thus being convenient to pick and place the jaw teeth 60 and the sucker 70, reducing the probability of the battery module transport apparatus being unable to determine the positions of picking and placing the jaw teeth 60 and the sucker 70 due to the movement of the mounting plate 112, and simultaneously reducing the potential safety hazards caused by the movement of the mounting plate 112 in the process of picking and placing the jaw teeth 60 and the sucker 70 by the staff.

It can be understood that the stop direction between the first lock head 15a and the first stop block 1121 is the moving direction of the mounting plate 112.

It can be understood that the specific number of the first locking structure 15 corresponding to the movable mounting plate 112 is not limited. There may be one or a plurality of first locking structures 15.

In some embodiments, referring to FIG. 3 to FIG. 7, the movable mounting plate 112 is configured with two first locking structures 15 correspondingly; in the third pick-and-place state, one of the first locking structures 15 is in the first locked state; in the fourth pick-and-place state, the other first locking structure 15 is in the first locked state; and the two first locking structures 15 in the first locked state have opposite stop directions relative to the mounting plate 112.

That is, in the third pick-and-place state, one first locking structure 15 is in the first locked state, and the other first locking structure 15 is in the first unlocked state; and in the fourth pick-and-place state, one first locking structure 15 is switched from the first locked state to the first unlocked state, and the other first locking structure 15 is switched from the first unlocked state to the first locked state.

The two first locking structures 15 have opposite stop directions, that is, the stop directions of the two first locking structures 15 are respectively a forward direction and a reverse direction along the moving direction of the mounting plate 112.

In this way, by alternately converting two first locking structures 15 with opposite stop directions between the first locked state and the first unlocked state, the mounting plate 112 is limited in both orientations along the moving direction thereof to respectively limit the moving range of the mounting plate 112 in the third pick-and-place state and the fourth pick-and-place state, thus facilitating the operation.

It can be understood that it is necessary to limit the moving stroke of the movable mounting plate 112 to avoid the detachment between the mounting plate 112 and the support plate 111.

Figure 6:
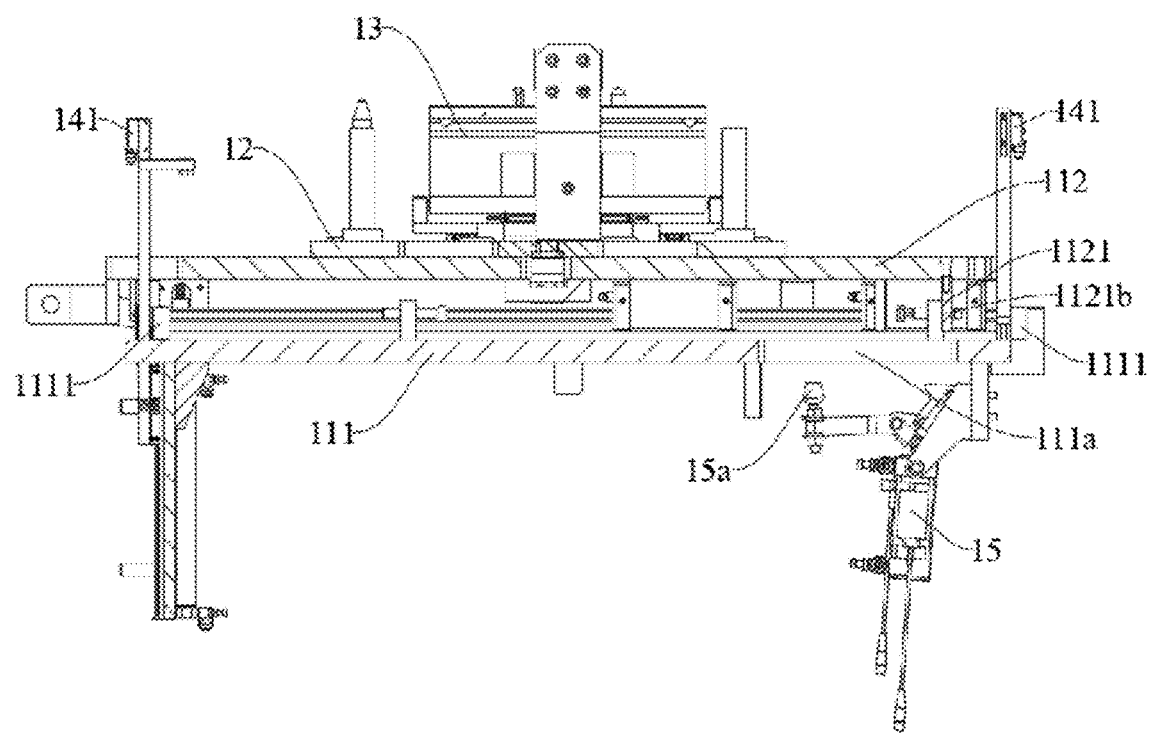
FIG. 6 is a cross-sectional schematic diagram in a position D-D in FIG. 5.

In some embodiments, referring to FIG. 3 and FIG. 6, the support plate 111 is provided with at least two first limiting blocks 1111; the two first limiting blocks 1111 are arranged at an interval along the moving direction of the mounting plate 112 to form stop fit with the mounting plate 112 along the moving direction thereof; and in the first locked state, the stop direction of the first lock head 15a and the first stop block 1121 is opposite to the stop direction of one of the first limiting blocks 1111.

The first limiting block 1111 can abut against the mounting plate 112 along the moving direction of the mounting plate 112 to limit the movement of the mounting plate 112. It can be understood that the two first limiting blocks 1111 respectively limit the forward direction and reverse direction of the moving direction of the mounting plate 112, thus achieving the purpose of limiting the moving stroke of the mounting plate 112.

In the first locked state, one of the first limiting blocks 1111 is in stop fit with the mounting plate 112. In this way, the first limiting block 1111 and the first locking structure 15 simultaneously limit the mounting plate 112 in both orientations along the moving direction thereof, thus achieving the purpose of fixing the positions of the mounting plate 112 in the third pick-and-place state and the fourth pick-and-place state.

In an embodiment where two first locking structures 15 are provided and have opposite stop directions, in the third pick-and-place state, one first locking structure 15 and one first limiting block 1111 achieve stop fit together with the mounting plate 112, so that the mounting plate 112 is maintained in the corresponding position of the third pick-and-place state; and in the fourth pick-and-place state, the other first locking structure 15 and the other first limiting block 1111 achieve stop fit together with the mounting plate 112, so that the mounting plate 112 is maintained in the corresponding position of the fourth pick-and-place state.

The specific form of the first locking structure 15 is not limited.

Figure 7:
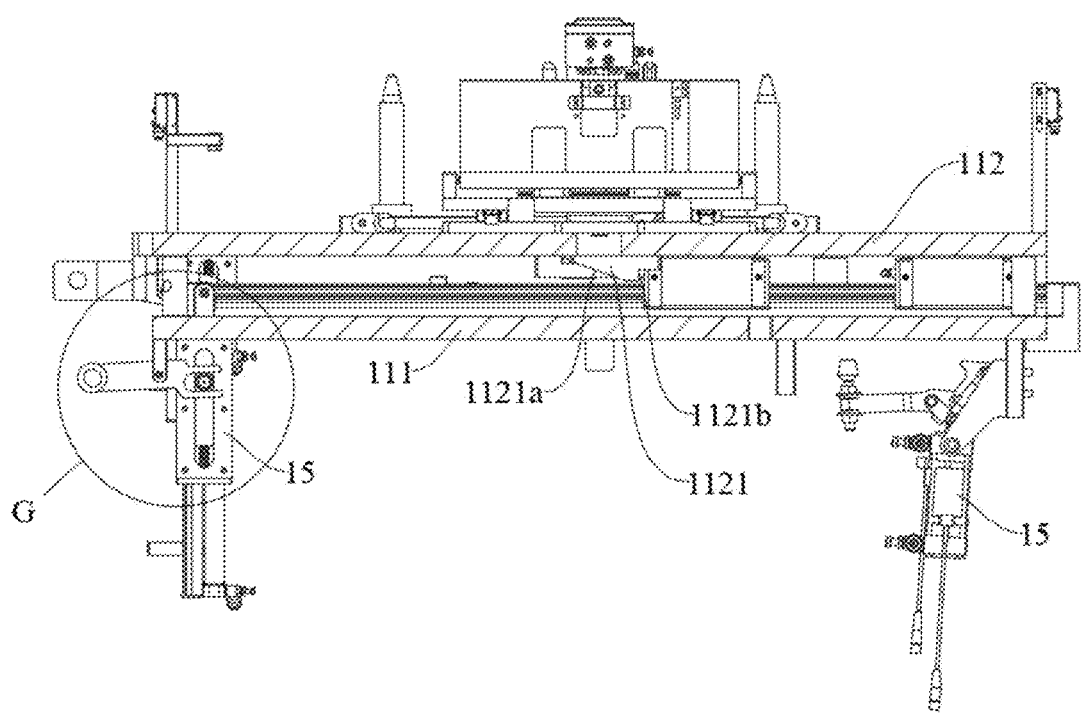
FIG. 7 is a cross-sectional schematic diagram in a position E-E in FIG. 5.

In some embodiments, referring to FIG. 4, FIG. 6 and FIG. 7, the first locking structure 15 is a pneumatic elbow clamp, and a pressure head of the first locking structure 15 forms the first lock head 15a.

The pneumatic elbow clamp is a type of pneumatic standard execution component that combines a cylinder and an elbow clamp. A driving end of the cylinder is drivingly connected to a four-bar linkage mechanism formed by the elbow clamp, and the cylinder drives the four-bar linkage mechanism for transmission, so that a pressure head located on the four-bar linkage mechanism moves. Based on the dead center principle of the four-bar linkage mechanism, an external force cannot act on the pressure head to achieve the purpose of unlocking.

In this way, by using the pneumatic elbow clamp as the first locking structure 15, the stability of the position of the first lock head 15a in the first locked state can be improved, and the probability of locking failure caused by the first stop block 1121 exerting an acting force on the first lock head 15a is reduced. Moreover, the use of the pneumatic elbow clamp is beneficial for achieving the automation of the operation of the quick-change platform and improving the working efficiency.

In some embodiments, referring to FIG. 4, the support plate is provided with a penetrated avoidance hole 111a; in the first unlocked state, the first locking structure 15 is located on the side of the support plate away from the mounting plate 112; and in the first locked state, the first lock head 15a passes through the avoidance hole 111a and abuts against the first stop block 1121. In this way, the gap between the support plate and the mounting plate 112 can be reduced to facilitate the mounting of the first locking structure 15.

Figure 8:
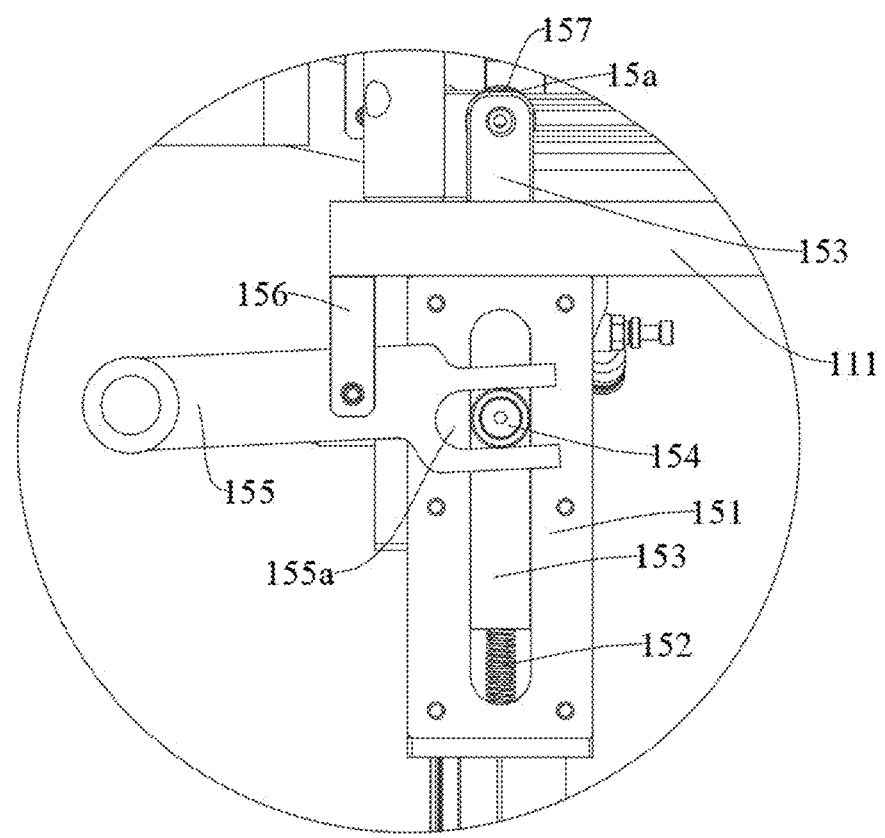
FIG. 8 is a partially enlarged schematic diagram in a position G in FIG. 7.
Figure 9:
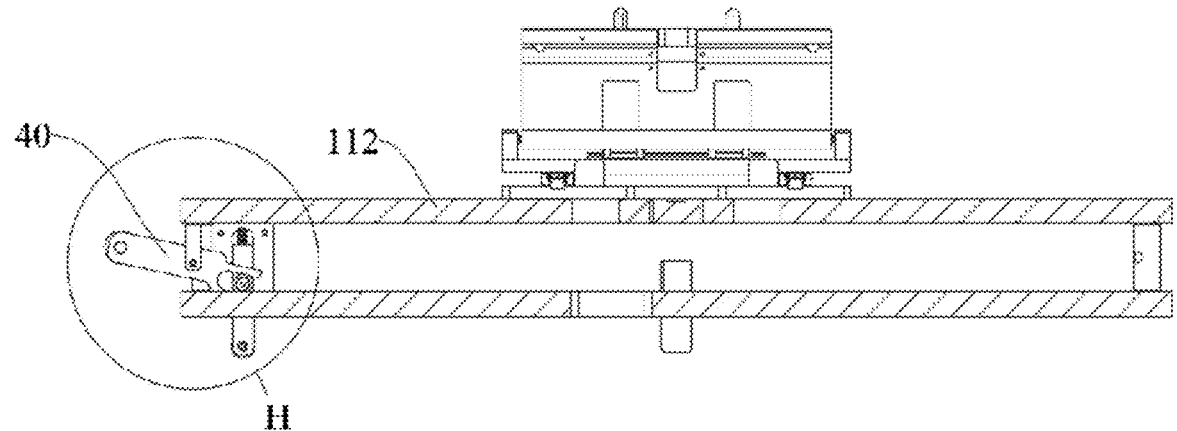
FIG. 9 is a cross-sectional schematic diagram in a position F-F in FIG. 5.

In some embodiments, referring to FIG. 8, the first locking structure 15 includes a first mounting element 151, a first elastic element 152 and a first push rod 153, the first mounting element 151 is arranged on the support plate 111, an end of the first elastic element 152 along the extension/retraction direction thereof abuts against the first mounting element 151, the other end abuts against the first push rod 153 to drive the first push rod 153 to extend and retract, and an end of the first push rod 153 away from the first elastic element 152 is provided with the first lock head 15a.

The first mounting element 151 is configured to provide fixed mounting positions for other components in the first locking structure 15.

A first retractable element 1325 provides a power source for the movement of the first push rod 153 to achieve the extension and retractage of the first push rod 153, thus achieving the purpose of driving the first lock head 15a to move.

In this way, the first retractable element 1325 is configured to drive the first lock head 15a to move, thus achieving the purpose of converting the first locking structure 15 between the first locked state and the first unlocked state.

It can be understood that the extending direction of the first elastic element 152 is a direction facing the mounting plate 112, and without an external force, the first retractable element 1325 is in an extended state. In this way, in the first locked state, the stop fit between the first lock head 15a and the first stop block 1121 can be achieved without an external force, thus improving the stability of locking.

The specific structural form of the first mounting element 151 is not limited. For example, the first mounting element 151 is of a case structure, a first mounting space is arranged in the first mounting element 151, the first elastic element 152 and the first push rod 153 are both arranged in the first mounting space, the side of the first mounting space away from the first elastic element 152 is opened, and the first push rod 153 is threaded in the open position. In this way, the first mounting element 151 achieves a role in protecting the first elastic element 152 and the first push rod 153, and limits the direction of the extending and retracting movement thereof to play a guiding role.

It can be understood that by pushing the first push rod 153 to move along the extension/retraction direction of the first elastic element 152 to the direction of compressing the first elastic element 152, the size of the first elastic element 152 along the extension/retraction direction is shortened, so that the first elastic element 152 is converted from the first locked state to the first unlocked state.

It can be understood that the specific manner of achieving the mutual conversion between the first unlocked state and the first locked state by pushing the first push rod 153 is not limited.

In some embodiments, referring to FIG. 7 and FIG. 8, one side of the first stop block 1121 along the moving direction of the mounting plate 112 is provided with a first guide slope 1121a, the other side is provided with a first stop surface 1121b, and the first stop surface 1121b extends along the extension/retraction direction of the first elastic element 152;

in the unlocked state, the first guide slope 1121a faces the first lock head 15a and extends along the moving direction of the mounting plate 112 towards the direction of compressing the first elastic element 152, so that during the movement of the mounting plate 112, the first guide slope 1121a can push the first push rod 153 to compress the first elastic element 152; and in the locked state, the first lock head 15a can be in stop fit with the first stop surface 1121b along the moving direction of the mounting plate 112.

During the movement of the mounting plate 112, the first guide slope 1121a is in contact with the first lock head 15a, and as the mounting plate 112 continues to move, the contact position between the first guide slope 1121a and the first lock head 15a gradually approaches the first elastic element 152, so that the first elastic element 152 is gradually compressed until the first lock head 15a is separated from the first guide slope 1121a, the compression force on the first push rod 153 decreases or even disappears, the first elastic element 152 is converted from the compressed state to the extended state, the first push rod 153 extends again under the action of the first elastic element 152 until the projection of the first lock head 15a is at least partially overlapped with the projection of the first stop surface 1121b in the projection along the moving direction of the mounting plate 112, and then, the first lock head 15a is in stop fit with the first stop surface 1121b to achieve the conversion to the first locked state.

In this way, the first guide slope 1121a guides and drives the first lock head 15a to synchronously complete the conversion of the first locking structure 15 from the first unlocked state to the first locked state during the movement of the mounting plate 112, thus simplifying the operation steps and improving the working efficiency.

In some embodiments, the first stop surface 1121b extends along the extension/retraction direction of the first elastic element 152 to reduce the probability that after the first stop surface 1121b abuts against the first lock head 15a, the acting force exerted on the first lock head 15a enables the first elastic element 152 to be compressed, and the first locking structure 15 is converted to the first unlocked state.

In some embodiments, referring to FIG. 8, the first locking structure 15 further includes a first rolling element 154, a first deflector rod 155 and a first mounting seat 156, one end of the first deflector rod 155 is provided with a first sliding groove 155a, the first rolling element 154 is arranged on the first push rod 153 and is in rotational fit with the first push rod 153, the first rolling element 154 is embedded in the first sliding groove 155a and is in stop fit with an inner wall of the first sliding groove 155a along the extension/retraction direction of the first elastic element 152, the first mounting seat 156 is arranged on the support plate 111, the first deflector rod 155 is rotationally connected to the first mounting seat 156 and has a rotation axis perpendicular to the extension/retraction direction of the first elastic element 152, the first sliding groove 155a extends perpendicular to the rotation axis of the first deflector rod 155, and the first rolling element 154 can move relative to the first deflector rod 155 along the extending direction of the first sliding groove 155a, so that the rotation of the first deflector rod 155 can drive the first elastic element 152 to extend and retract.

The first deflector rod 155 is used for the staff to contact and exert an acting force to avoid the potential safety hazards caused by direct contact between the staff and the first push rod 153.

The specific form of the first rolling element 154 is not limited, such as a ball bearing.

The specific manner of achieving the rotational connection between the first deflector rod 155 and the first mounting seat 156 is not limited, for example, the rotational connection may be achieved by rotating a pin roll to pass through the first deflector rod 155 and the first mounting seat 156.

That is, a slider-crank mechanism is formed among the first deflector rod 155, the first rolling element 154 and the first push rod 153. During the rotation of the first deflector rod 155, the first sliding groove 155a rotates accordingly, and the inner wall of the first sliding groove 155a abuts against the first rolling element 154, thus exerting an acting force on the first rolling element 154. Due to the moving trend of the first rolling element 154 along the extension/retraction direction of the first elastic element 152 formed by the first push rod 153, the acting force exerted by the inner wall of the first sliding groove 155a on the first rolling element 154 can be divided into a component force along the extension/retraction direction of the first elastic element 152 and a component force along the tangential direction of the first rolling element 154, so as to achieve the purpose of driving the first rolling element 154 to move along the extension/retraction direction of the first elastic element 152 to push the first push rod 153 to move.

In this way, the rotation of the first deflector rod 155 is converted into linear motion, thus achieving the purpose of driving the first push rod 153. Moreover, the rolling of the first rolling element 154 can effectively reduce the friction force between the first rolling element 154 and the inner wall of the first sliding groove 155a, thus reducing the wear and prolonging the service life.

It can be understood that taking the rotational connection position between the first deflector rod 155 and the first mounting seat 156 as a boundary position, the length of the part of the first deflector rod 155 located on one side of the first sliding groove 155a is less than the length of the part located on the other side. In this way, the first deflector rod 155 forms a labor-saving lever, thus improving the operation convenience of the staff.

It can be understood that in the process of achieving the stop fit between the first lock head 15a and the first stop block 1121, friction will occur between the first lock head 15a and the first stop block 1121, thus causing the wear of the first lock head 15a and the first stop block 1121.

In some embodiments, referring to FIG. 8, an end of the first push rod 153 away from the first elastic element 152 is provided with a second rolling element 157, the second rolling element 157 is rotationally connected to the first push rod 153, and the second rolling element 157 forms the first lock head 15a. That is, the friction between the second rolling element 157 and the first stop block 1121 is rolling friction, thus effectively reducing the friction force between the second rolling element 157 and the first stop block 1121, reducing the wear between the second rolling element 157 and the first stop block 1121, and prolonging the service life of the second rolling element 157 and the first stop block 1121.

The specific form of the second rolling element 157 is not limited, such as a ball bearing or a roller.

It can be understood that in an embodiment where a plurality of first locking structures 15 are provided, all first locking structures 15 may be pneumatic elbow clamps; all first locking structures 15 may also be in the structural forms of the first rolling element 154, the first deflector rod 155 and the first mounting seat 156; or part of the first locking structures 15 may be pneumatic elbow clamps, and the other part of the first locking structures 15 may be in the structural forms of the first rolling element 154, the first deflector rod 155 and the first mounting seat 156.

The specific structural form of the sucker placing assembly 12 is not limited.

Figure 11:
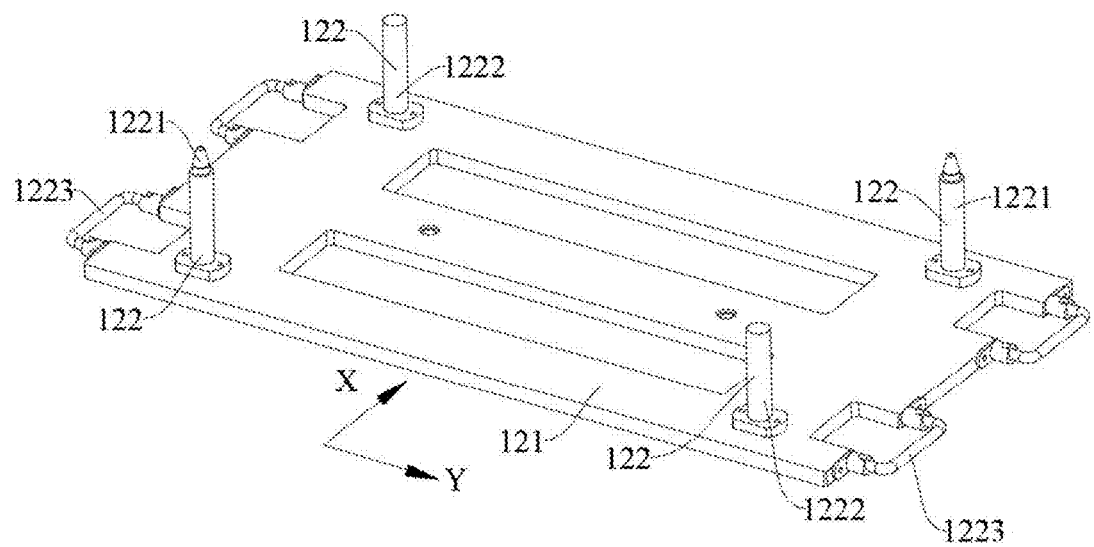
FIG. 11 is a schematic diagram of a sucker placing assembly in an embodiment of the present disclosure.

Exemplarily, referring to FIG. 11, the sucker placing assembly 12 includes a placing plate 121 and positioning pins 122, the placing plate 121 is arranged on the tray assembly 11 for placing the sucker 70, and the positioning pins 122 are arranged on one side of the placing plate 121 and extend perpendicular to the thickness direction of the placing plate 121 for insertion into the sucker 70.

The placing plate 121 is configured to carry the weight of the sucker 70 and provide an operation position required for transport for the staff to prevent the staff from touching the sucker 70 during transport.

The positioning pins 122 cooperate with holes on the sucker 70 to fix the position of the sucker 70 through the stop fit between the inner walls of the holes and the positioning pins 122.

In this way, by arranging the placing plate 121 and the positioning pins 122, the positioning of the sucker 70 on the sucker placing assembly 12 is achieved, and it is convenient to pick and place as well as transport the sucker 70 together with the sucker placing assembly 12, thus improving the working efficiency.

It can be understood that the thickness direction of the placing plate 121 is a vertical direction, that is, the positioning pins 122 extend along the vertical direction.

It can be understood that the placing plate 121 is detachably connected to the tray assembly 11; or the tray assembly 11 is provided with positioning protrusions extending along the vertical direction, the placing plate 121 is provided with positioning holes extending along the vertical direction, and the positioning protrusions are embedded in the positioning holes and form stop fit with the inner walls of the positioning holes to play a role in limiting the placing plate 121.

It can be understood that the positioning pins 122 need to be positioned during the insertion into the sucker 70 to prevent collision between the positioning pins 122 and the sucker 70.

In some embodiments, referring to FIG. 11, the positioning pins 122 include two first positioning pins 1221 and two second positioning pins 1222, an end of the first positioning pin 1221 away from the placing plate 121 is conical and is higher than the second positioning pin 1222, the first positioning pins 1221 are spaced apart from one of the second positioning pins 1222 along a first direction and spaced apart from the other second positioning pin 1222 along a second direction, and the first direction is orthogonal to the second direction.

That is, the two first positioning pins 1221 are arranged diagonally, and the two second positioning pins 1222 are arranged diagonally.

The first positioning pin 1221 is higher than the second positioning pin 1222, indicating that the size of the first positioning pin 1221 along the thickness direction of the placing plate 121 is greater than that of the second positioning pin 1222, thus facilitating the insertion of the first positioning pin 1221 into the sucker 70 before the second positioning pin 1222.

If there is a certain deviation between the position of the sucker 70 and the position of the sucker placing assembly 12, the edges of the holes of the sucker 70 and the surfaces of the conical parts of the first positioning pins 1221 play a guiding role, so that the first positioning pins 1221 can smoothly enter the holes of the sucker 70.

In this way, through the guiding role of the first positioning pin 1221, the probability of damage to the positioning pin 122 and the sucker 70 caused by collision is reduced. Moreover, the requirement for repeated positioning accuracy between the battery module transport apparatus and the quick-change platform in the process of placing the sucker 70 is reduced.

In some embodiments, the placing plate 121 is placed on the mounting plate 112, and the placing plate 121 and the mounting plate 112 have the same thickness direction.

In some embodiments, one of the first direction and the second direction is the same as the moving direction of the mounting plate 112, and the first direction and the second direction are both perpendicular to the vertical direction.

In some embodiments, referring to FIG. 11, edges of the placing plate 121 are provided with transport handles 1223, so that the staff can hold the transport handles 1223 to transport the sucker placing assembly 12 and the sucker 70 placed thereon.

In some embodiments, the placing plate 121 is provided with a radio frequency identification (RFID) chip for detecting whether the sucker 70 placed on the placing plate 121 has a required model.

The specific structural form of the clamping jaw placing assembly 13 is not limited.

Figure 12:
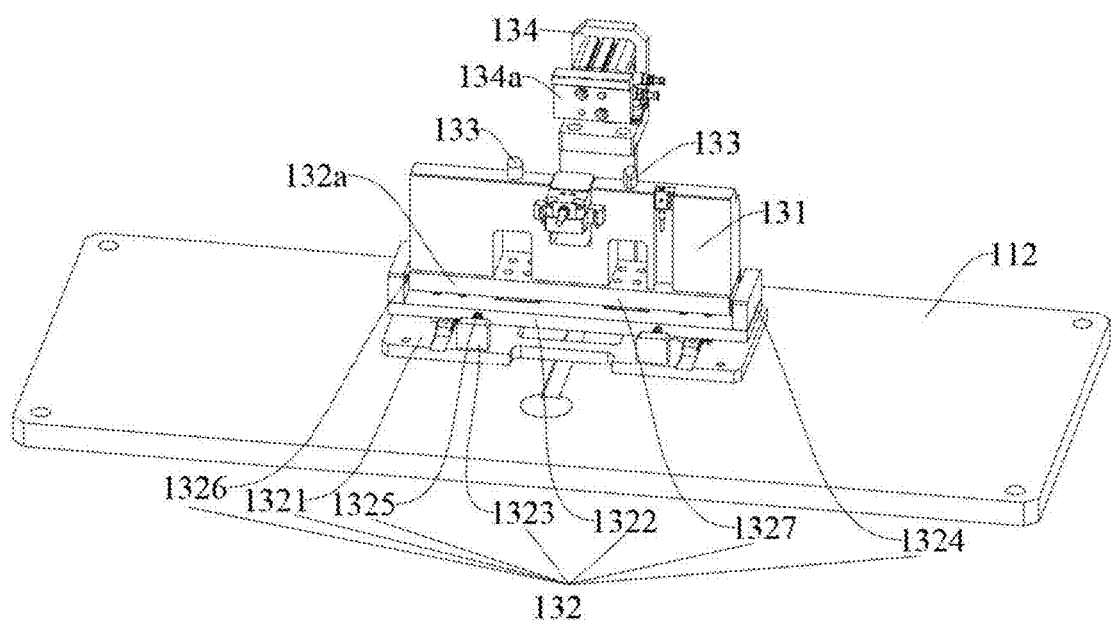
FIG. 12 is a schematic diagram of a clamping jaw placing assembly and a mounting plate in an embodiment of the present disclosure.
Figure 13:
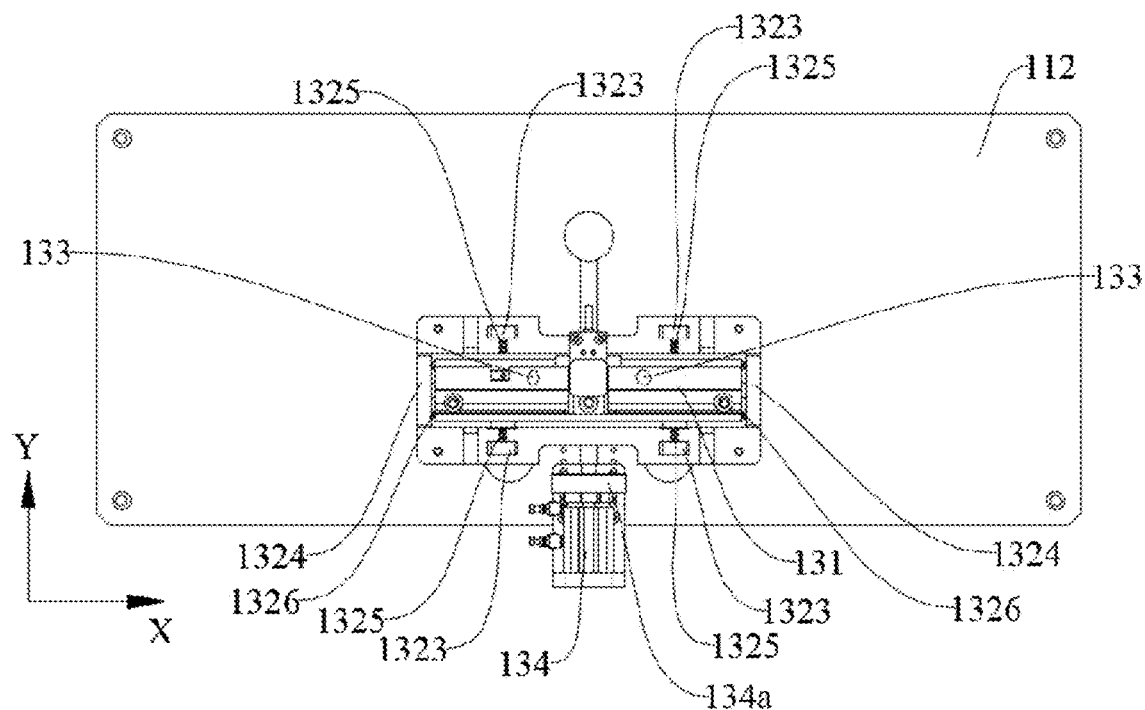
FIG. 13 is a schematic diagram of the embodiment in FIG. 12 from another perspective.

Exemplarily, referring to FIG. 12 and FIG. 13, the clamping jaw placing assembly 13 includes a contour support block 131 and a floating assembly 132, the floating assembly 132 is arranged on the tray assembly 11, the floating assembly 132 has a floating end 132a, the contour support block 131 is arranged on the floating end 132a, and the floating end 132a is configured to move in a case that the jaw teeth 60 push the floating end 132a, so that the floating end 132a can be configured to receive the jaw teeth 60 and returns to an initial position after the pushing force is eliminated.

The contour support block 131 is configured to place and carry the jaw teeth 60. The contour support block 131 is provided with a contour surface, and the shape of the contour surface is adapted to the shape of the outer surface of part of the jaw teeth 60 to increase the contact area between the jaw teeth 60 and the contour support block 131 when the jaw teeth 60 are placed on the contour support block 131, thus reducing the probability of damage to the jaw teeth 60 and the contour support block 131 due to the self-gravity of the jaw teeth 60, and being beneficial for maintaining the stability of the jaw teeth 60 during movement.

The position of the floating end 132a of the floating assembly 132, which is not subjected to an external force, is the initial position. In the process of placing the jaw teeth 60 on the contour support block 131, due to a positioning error between the jaw teeth 60 and the contour support block 131, the jaw teeth 60 are in contact with the contour support block 131 and exert an acting force on the contour support block 131 as the battery module transport apparatus moves, and then, the contour support block 131 drives the floating end to deviate from the initial position; and after the jaw teeth 60 are separated from the battery module transport apparatus, the acting force exerted on the contour support block 131 is reduced, and the floating end 132a returns to the initial position under the action of the internal acting force of the floating assembly 132.

In this way, on the one hand, by arranging the contour support block 131, it is beneficial for maintaining the stability during the movement of the jaw teeth 60 on the quick-change platform, and it is beneficial for reducing the contact pressure between the jaw teeth 60 and the clamping jaw placing assembly 13; and on the other hand, the floating assembly 132 can play a role in buffering the collision between the jaw teeth 60 and the contour support block 131 by floating, improve the adaptability to the position deviation between the jaw teeth 60 and the contour support block 131 in the process of placing the jaw teeth 60, and reduce the requirement for the repeated positioning accuracy between the battery module transport apparatus and the quick-change platform in the process of placing the jaw teeth 60.

In some embodiments, the contour support block 131 is provided with an RFID chip for detecting whether the jaw teeth 60 placed on the contour support block 131 have a required model.

The specific structural form of the floating assembly 132 is not limited.

Exemplarily, referring to FIG. 12 and FIG. 13, the floating assembly 132 includes a first mounting block 1321, a second mounting block 1322, at least two first chock blocks 1323, at least two second chock blocks 1324, first retractable elements 1325, second retractable elements 1326 and a floating block 1327, the first mounting block 1321 is arranged on the tray assembly 11, the second mounting block 1322 is arranged on the first mounting block 1321 and is in sliding fit along a third direction, the first chock blocks 1323 are arranged on both sides of the first mounting block 1321 along the third direction and are arranged at an interval, the first retractable element 1325 is clamped between the first chock blocks 1323 and the second mounting block 1322 and can elastically extend and retract along the third direction, the floating block 1327 is arranged on the second mounting block 1322 and is in sliding fit along a fourth direction, the second chock blocks 1324 are arranged on both sides of the floating block 1327 along the fourth direction and are arranged at an interval, the second retractable element 1326 is clamped between the second chock blocks 1324 and the floating block 1327 and can elastically extend and retract along the fourth direction, the floating block 1327 forms the floating end 132a, and the third direction is orthogonal to the fourth direction.

The first mounting block 1321 provides mounting positions for other components in the floating assembly 132.

The first retractable element 1325 is located between the first chock block 1323 and the second mounting block 1322, and the first chock block 1323 is fixed relative to the first mounting block 1321, so that under the extending and retracting acting force of the first retractable element 1325, the second mounting block 1322 can move relative to the first mounting block 1321. Because the second mounting block 1322 is provided with first retractable elements 1325 along both sides of the third direction, under the action of the first retractable elements 1325 on both sides, the force on the second mounting block 1322 along the third direction is balanced.

The second retractable element 1326 is located between the second chock block 1324 and the floating block 1327, and the second chock block 1324 is fixed relative to the second mounting block 1322, so that under the extending and retracting acting force of the second retractable element 1326, the floating block 1327 can move relative to the second mounting block 1322. Because the floating block 1327 is provided with second retractable elements 1326 along both sides of the fourth direction, under the action of the second retractable elements 1326 on both sides, the force on the floating block 1327 along the fourth direction is balanced.

In a case that the jaw teeth 60 are in contact with the contour support block 131, the floating block 1327 moves with the contour support block 131 and then deviates from the initial position, so that the first retractable element 1325 on one side of the second mounting block 1322 is compressed, and the first retractable element 1325 on the other side is extended; and/or the second retractable element 1326 on one side of the floating block 1327 is compressed, and the second retractable element 1326 on the other side is extended. After the acting force exerted by the battery module transport apparatus on the contour block is eliminated, the first retractable elements 1325 on both sides of the second mounting block 1322 release elastic potential energy, and the second retractable elements 1326 on both sides of the floating block 1327 release elastic potential energy, so as to respectively drive the second mounting block 1322 and the floating block 1327 to move until the second mounting block 1322 and the floating block 1327 return to force balance positions again, so that the floating block 1327 returns to the initial position.

In this way, by the extension and retractage of the first retractable element 1325 and the second retractable element 1326, it is beneficial for playing a role in buffering the impact caused by placing the jaw teeth 60 on the contour support block 131, improving the adaptability to the position deviation between the jaw teeth 60 and the contour support block 131 in the process of placing the jaw teeth 60, reducing the requirement for the repeated positioning accuracy between the battery module transport apparatus and the quick-change platform in the process of placing the jaw teeth 60, reducing the probability of the battery module transport apparatus getting stuck in the process of picking and placing the jaw teeth 60, and reducing the requirement for the debugging accuracy.

In some embodiments, the third direction and the fourth direction are both perpendicular to the vertical direction.

In some embodiments, one of the first direction and the second direction is the same as the third direction, and the other is the same as the fourth direction.

The specific types of the first retractable element 1325 and the second retractable element 1326 are not limited, such as springs.

The specific manner of achieving the sliding fit between the floating block 1327 and the second mounting block 1322 as well as between the first mounting block 1321 and the second mounting block 1322 is not limited, for example, a ball slider cooperates with a guide rail.

The specific manner of fixing the jaw teeth 60 on the contour support block 131 is not limited.

Exemplarily, referring to FIG. 12 and FIG. 13, the contour support block 131 is provided with third positioning pins 133 for insertion into the jaw teeth 60, the clamping jaw placing assembly 13 includes a pushing element 134, the pushing element 134 has a pushing end 134a capable of extending and retracting towards the contour support block 131, and the extension/retraction direction thereof intersects with the extending direction of the third positioning pin 133, and the pushing end 134a is configured to abut against the jaw teeth 60 placed on the contour support block 131.

The third positioning pins 133 are configured to adapt to holes on the jaw teeth 60 to fix the positions of the jaw teeth 60 through the stop fit between the inner walls of the holes and the third positioning pins 133.

The pushing element 134 extends towards the contour support block 131 and then abuts against the jaw teeth 60 on the contour support block 131 to push the jaw teeth 60 to enable the third positioning pins 133 to abut against the inner walls of the holes, so that a friction force is generated between the pushing element 134 and the contour support block 131 as well as between the third positioning pins 133 and the inner walls of the holes.

In this way, by suppressing the moving trend of the jaw teeth 60 on the contour support block 131 through the friction force, the stability of the jaw teeth 60 on the contour support block 131 is improved. At the same time, in the process of separating the battery module transport apparatus from the jaw teeth 60, the trend of removing the jaw teeth 60 from the contour support block 131 due to the movement of the battery module transport apparatus is suppressed.

In some embodiments, the third positioning pins 133 extend along the vertical direction, so that when the jaw teeth 60 fall along the vertical direction, the third positioning pins 133 are directly inserted into the holes on the jaw teeth 60.

In some embodiments, referring to FIG. 12 and FIG. 13, two third positioning pins 133 are provided, where one of the third positioning pins 133 is a cylindrical pin, and the other is a rhombic pin. On the one hand, the two third positioning pins 133 cooperate with each other to suppress the rotating trend of the jaw teeth 60 relative to the contour support block 131; and on the other hand, excessive positioning between the third positioning pins 133 and the jaw teeth 60 is avoided, and the probability that the position error between the two third positioning pins 133 affects the cooperation between the two third positioning pins 133 and the jaw teeth 60 is reduced.

In some embodiments, referring to FIG. 1 and FIG. 2, the quick-change platform includes a frame 30, the tray set 10 is arranged on the frame 30, and the tray set 10 is in sliding fit with the frame 30.

The frame 30 is at least configured to carry the tray set 10, and provides a stable mounting position for the tray set 10, thus reducing the adverse effects of the ground vibration on the movement of the tray set 10. The frame 30 supports the tray set 10, thus reducing the load on the driving set 20.

The specific manner of achieving the sliding fit between the tray set 10 and the frame 30 is not limited. For example, the frame 30 is provided with a guide rail, the tray set 10 is provided with a ball slider, and the ball slider is in sliding fit with the guide rail.

The specific manner of manufacturing the frame 30 is not limited. For example, referring to FIG. 1, the frame 30 is formed by welding a plurality of square steel tubes. For another example, the frame 30 is formed by splicing a plurality of aluminum alloy profiles.

It can be understood that in a case that the quick-change platform is in the first pick-and-place state or the second pick-and-place state, it is necessary to limit the position of the tray set 10 to reduce the adverse effects on the picking and placing operations due to the movement of the tray set 10.

In some embodiments, referring to FIG. 1, FIG. 3, FIG. 9, FIG. 14 and FIG. 15, the quick-change platform includes a second locking structure 40 and a second stop block 50, the second locking structure 40 is arranged on one of the frame 30 and the tray set 10, the second stop block 50 is arranged on the other one, the second locking structure 40 is provided with a movable second lock head 40a, and the second locking structure 40 has a second locked state and a second unlocked state.

In the second locked state, the second lock head 40a can be in stop fit with the second stop block 50 along the moving direction of the tray set 10 to limit the movement of the tray set 10. That is, the second lock head 40a can abut against the second stop block 50 along the moving direction of the tray set 10 to suppress the movement of the tray set 10, thus achieving the purpose of maintaining the tray set 10 in the first pick-and-place state or the second pick-and-place state.

In the second unlocked state, in the projection along the moving direction of the tray set 10, the projection of the second lock head 40a is separated from the projection of the second stop block 50, so that the tray set 10 can move. That is, in the projection along the moving direction of the tray set 10, the projection of the second lock head 40a is not overlapped with the projection of the second stop block 50, so that the purpose of converting the tray set 10 between the first pick-and-place state and the second pick-and-place state can be achieved by moving.

In this way, by converting the second locking structure 40 between the second locked state and the second unlocked state, the further locking of the position of the tray set 10 is achieved, which is beneficial for achieving the purpose of stabilizing the tray set 10 in the position of the second locked state, thus being convenient to pick and place the jaw teeth 60 and the sucker 70, reducing the probability of the battery module transport apparatus being unable to determine the positions of picking and placing the jaw teeth 60 and the sucker 70 due to the movement of the tray set 10, and simultaneously reducing the potential safety hazards caused by the movement of the tray set 10 in the process of picking and placing the jaw teeth 60 and the sucker 70 by the staff.

It can be understood that the stop direction between the second lock head 40a and the second stop block 50 is the moving direction of the tray set 10.

It can be understood that the specific number of the second locking structure 40 corresponding to the driving set 20 is not limited. There may be one or a plurality of second locking structures 40.

In some embodiments, referring to FIG. 1 and FIG. 2, the tray set 10 is configured with two second locking structures 40 correspondingly; in the first pick-and-place state, one of the second locking structures 40 is in the second locked state; in the second pick-and-place state, the other second locking structure 40 is in the second locked state; and the two second locking structures 40 in the second locked state have opposite stop directions relative to the tray set 10.

That is, in the first pick-and-place state, one of the second locking structures 40 is in the second locked state, and the other second locking structure 40 is in the second unlocked state; and in the second pick-and-place state, one of the second locking structures 40 is switched from the second locked state to the second unlocked state, and the other second locking structure 40 is switched from the second unlocked state to the second locked state.

The two second locking structures 40 have opposite stop directions, that is, the stop directions of the two second locking structures 40 are respectively a forward direction and a reverse direction along the moving direction of the tray set 10.

In this way, by alternately converting two second locking structures 40 with opposite stop directions between the second locked state and the second unlocked state, the tray set 10 is limited in both orientations along the moving direction thereof to respectively limit the moving range of the tray set 10 in the first pick-and-place state and the second pick-and-place state, thus facilitating the operation.

In some embodiments, referring to FIG. 1, the frame 30 is provided with at least two second limiting blocks 31; the two second limiting blocks 31 are arranged at an interval along the moving direction of the tray set 10 to form stop fit with the tray set 10 along the moving direction thereof; and in the second locked state, the stop direction of the second lock head 40a and the second stop block 50 is opposite to the stop direction of one of the second limiting blocks 31.

The second limiting block 31 can abut against the tray set 10 along the moving direction of the tray set 10 to limit the movement of the tray set 10. It can be understood that the two second limiting blocks 31 respectively limit the forward direction and reverse direction of the moving direction of the tray set 10, thus achieving the purpose of limiting the moving stroke of the tray set 10.

In the second locked state, one of the second limiting blocks 31 is in stop fit with the tray set 10. In this way, the second limiting block 31 and the second locking structure 40 simultaneously limit the tray set in both orientations along the moving direction thereof, thus achieving the purpose of fixing the positions of the tray set 10 in the first pick-and-place state and the second pick-and-place state.

In an embodiment where two second locking structures 40 are provided and have opposite stop directions, in the first pick-and-place state, one second locking structure 40 and one second limiting block 31 achieve stop fit together with the tray set 10, so that the mounting plate 112 is maintained in the corresponding position of the first pick-and-place state; and in the second pick-and-place state, the other second locking structure 40 and the other second limiting block 31 achieve stop fit together with the tray set 10, so that the tray set 10 is maintained in the corresponding position of the second pick-and-place state.

The specific form of the second locking structure 40 is not limited.

Figure 16:
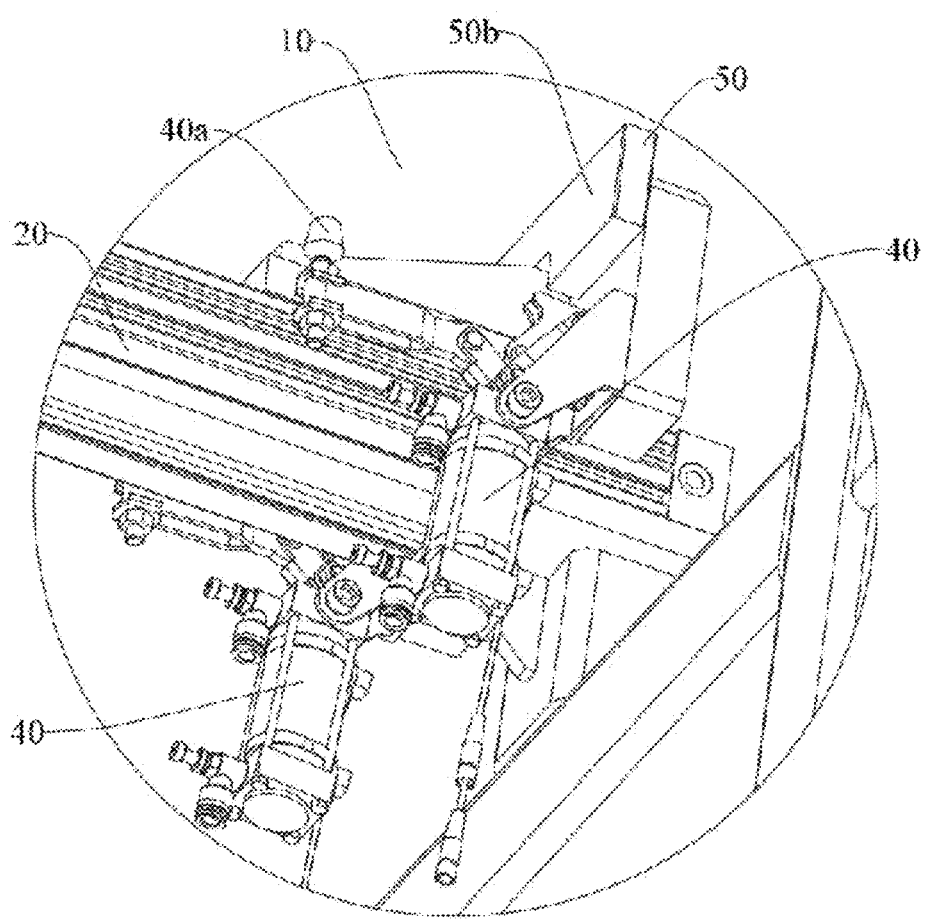
FIG. 16 is a partially enlarged schematic diagram in a position C in FIG. 2.

In some embodiments, referring to FIG. 2 and FIG. 16, the second locking structure 40 is a pneumatic elbow clamp and is arranged on the frame 30, and a pressure head of the second locking structure 40 forms the second lock head 40a.

By using the pneumatic elbow clamp as the second locking structure 40, the stability of the position of the second lock head 40a in the second locked state can be improved, and the probability of locking failure caused by the second stop block 50 exerting an acting force on the second lock head 40a is reduced. Moreover, the use of the pneumatic elbow clamp is beneficial for achieving the automation of the operation of the quick-change platform and improving the working efficiency.

Figure 10:
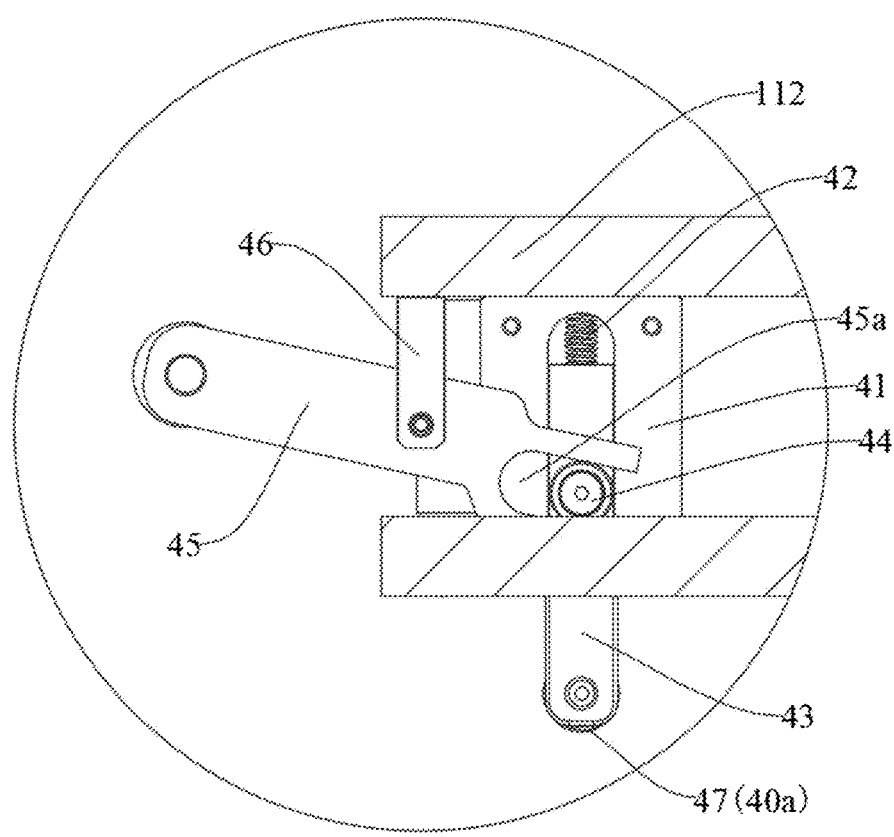
FIG. 10 is a partially enlarged schematic diagram in a position H in FIG. 9.
Figure 14:
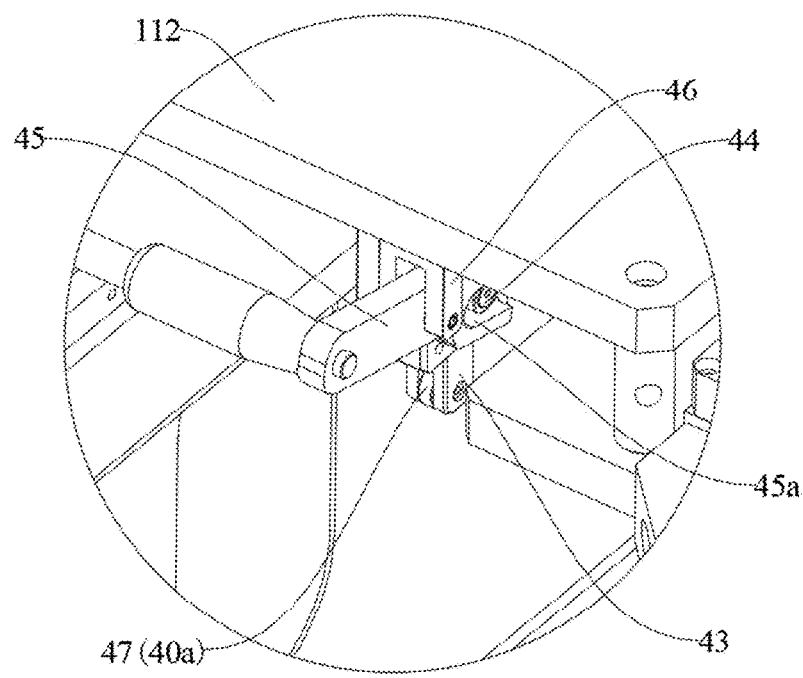
FIG. 14 is a partially enlarged schematic diagram in a position A in FIG. 1.

In some embodiments, referring to FIG. 10 and FIG. 14, the second locking structure 40 includes a second mounting element 41, a second elastic element 42 and a second push rod 43, the second mounting element 41 is arranged on the tray set 10, one end of the second elastic element 42 along the extension/retraction direction thereof abuts against the second mounting element 41, the other end abuts against the second push rod 43 to drive the second push rod 43 to extend and retract, and an end of the second push rod 43 away from the second elastic element 42 is provided with the second lock head 40*a*.

The second mounting element 41 is configured to provide fixed mounting positions for other components in the second locking structure 40.

The second retractable element 1326 provides a power source for the movement of the second push rod 43 to achieve the extension and retractage of the second push rod 43, thus achieving the purpose of driving the second lock head 40*a* to move.

In this way, the second retractable element 1326 is configured to drive the second lock head 40*a* to move, thus achieving the purpose of converting the second locking structure 40 between the second locked state and the second unlocked state.

It can be understood that without an external force, the second retractable element 1326 is in an extended state. In this way, in the second locked state, the stop fit between the second lock head 40*a* and the second stop block 50 can be achieved without an external force, thus improving the stability of locking.

The specific structural form of the second mounting element 41 is not limited. For example, the second mounting element 41 is of a case structure, a second mounting space is arranged in the second mounting element 41, the second elastic element 42 and the second push rod 43 are both arranged in the second mounting space, the side of the second mounting space away from the second elastic element 42 is opened, and the second push rod 43 is threaded in the open position. In this way, the second mounting element 41 achieves a role in protecting the second elastic element 42 and the second push rod 43, and limits the direction of the extending and retracting movement thereof to play a guiding role.

It can be understood that by pushing the second push rod 43 to move along the extension/retraction direction of the second elastic element 42 to the direction of compressing the second elastic element 42, the size of the second elastic element 42 along the extension/retraction direction is shortened, so that the second elastic element 42 is converted from the second locked state to the second unlocked state.

It can be understood that the specific manner of achieving the mutual conversion between the second unlocked state and the second locked state by pushing the second push rod 43 is not limited.

Figure 15:
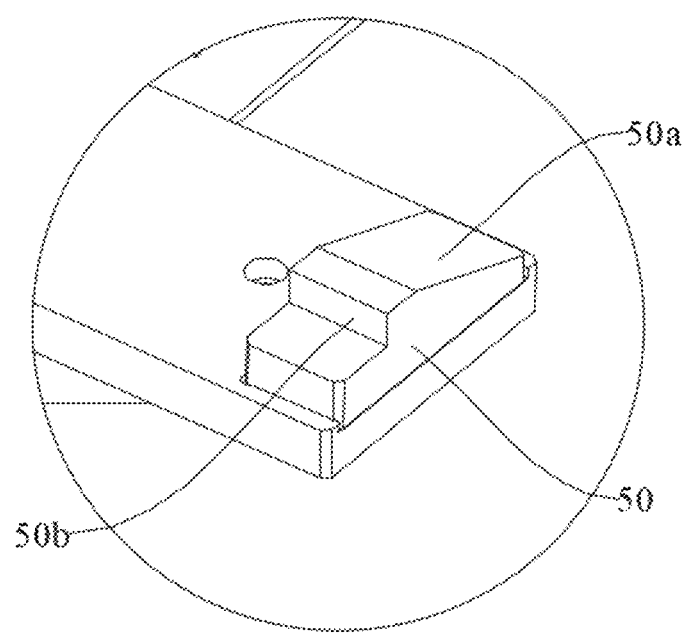
FIG. 15 is a partially enlarged schematic diagram in a position B in FIG. 1.

In some embodiments, referring to FIG. 15, one side of the second stop block 50 along the moving direction of the tray set 10 is provided with a second guide slope 50*a*, the other side is provided with a second stop surface 50*b*, and the second stop surface 50*b* extends along the extension/ retraction direction of the second elastic element 42;

in the unlocked state, the second guide slope 50*a* faces the second lock head 40*a* and extends along the moving direction of the tray set 10 towards the direction of compressing the second elastic element 42, so that during the movement of the tray set 10, the second guide slope 50*a* can push the second push rod 43 to compress the second elastic element 42; and in the locked state, the second lock head 40*a* can be in stop fit with the second stop surface 50*b* along the moving direction of the tray set 10.

During the movement of the tray set 10, the second guide slope 50*a* is in contact with the second lock head 40*a*, and as the tray set 10 continues to move, the contact position between the second guide slope 50*a* and the second lock head 40*a* gradually approaches the second elastic element 42, so that the second elastic element 42 is gradually compressed until the second lock head 40*a* is separated from the second guide slope 50*a*, the compression force on the second push rod 43 decreases or even disappears, the second elastic element 42 is converted from the compressed state to the extended state, the second push rod 43 extends again under the action of the second elastic element 42 until the projection of the second lock head 40*a* is at least partially overlapped with the projection of the second stop surface 50*b* in the projection along the moving direction of the tray set 10, and then, the second lock head 40*a* is in stop fit with the second stop surface 50*b* to achieve the conversion to the second locked state.

In this way, the second guide slope 50*a* guides and drives the second lock head 40*a* to synchronously complete the conversion of the second locking structure 40 from the second unlocked state to the second locked state during the movement of the tray set 10, thus simplifying the operation steps and improving the working efficiency.

In some embodiments, the second stop surface 50*b* extends along the extension/retraction direction of the second elastic element 42 to reduce the probability that after the second stop surface 50*b* abuts against the second lock head 40*a*, the acting force exerted on the second lock head 40*a* enables the second elastic element 42 to be compressed, and the second locking structure 40 is converted to the second unlocked state.

In some embodiments, referring to FIG. 10 and FIG. 14, the second locking structure 40 further includes a third rolling element 44, a second deflector rod 45 and a second mounting seat 46, one end of the second deflector rod 45 is provided with a second sliding groove 45*a*, the third rolling element 44 is arranged on the second push rod 43 and is in rotational fit with the second push rod 43, the third rolling element 44 is embedded in the second sliding groove 45*a* and is in stop fit with an inner wall of the second sliding groove 45*a* along the extension/retraction direction of the second elastic element 42, the second mounting seat 46 is arranged on the tray set 10, the second deflector rod 45 is rotationally connected to the second mounting seat 46 and has a rotation axis perpendicular to the extension/retraction direction of the second elastic element 42, the second sliding groove 45*a* extends perpendicular to the rotation axis of the second deflector rod 45, and the third rolling element 44 can move relative to the second deflector rod 45 along the extending direction of the second sliding groove 45*a*, so that the rotation of the second deflector rod 45 can drive the second elastic element 42 to extend and retract.

The second deflector rod 45 is used for the staff to contact and exert an acting force to avoid the potential safety hazards caused by direct contact between the staff and the second push rod 43.

The specific form of the third rolling element 44 is not limited, such as a ball bearing.

The specific manner of achieving the rotational connection between the second deflector rod 45 and the second mounting seat 46 is not limited, for example, the rotational connection may be achieved by rotating a pin roll to pass through the second deflector rod 45 and the second mounting seat 46.

That is, a slider-crank mechanism is formed among the second deflector rod 45, the third rolling element 44 and the second push rod 43. During the rotation of the second deflector rod 45, the second sliding groove 45*a* rotates accordingly, and the inner wall of the second sliding groove 45*a* abuts against the third rolling element 44, thus exerting an acting force on the third rolling element 44. Due to the moving trend of the third rolling element 44 along the extension/retraction direction of the second elastic element 42 formed by the second push rod 43, the acting force exerted by the inner wall of the second sliding groove 45*a* on the third rolling element 44 can be divided into a component force along the extension/retraction direction of the second elastic element 42 and a component force along the tangential direction of the third rolling element 44, so as to achieve the purpose of driving the third rolling element 44 to move along the extension/retraction direction of the second elastic element 42 to push the second push rod 43 to move.

In this way, the rotation of the second deflector rod 45 is converted into linear motion, thus achieving the purpose of driving the second push rod 43. Moreover, the rolling of the third rolling element 44 can effectively reduce the friction force between the third rolling element 44 and the inner wall of the second sliding groove 45*a*, thus reducing the wear and prolonging the service life.

It can be understood that taking the rotational connection position between the second deflector rod 45 and the second mounting seat 46 as a boundary position, the length of the part of the second deflector rod 45 located on one side of the second sliding groove 45*a* is less than the length of the part located on the other side. In this way, the second deflector rod 45 forms a labor-saving lever, thus improving the operation convenience of the staff.

In some embodiments, referring to FIG. 10 and FIG. 14, an end of the second push rod 43 away from the second elastic element 42 is provided with a fourth rolling element 47, the fourth rolling element 47 is rotationally connected to the second push rod 43, and the fourth rolling element 47 forms the second lock head 40*a*. That is, the friction between the fourth rolling element 47 and the second stop block 50 is rolling friction, thus effectively reducing the friction force between the fourth rolling element 47 and the second stop block 50, reducing the wear between the fourth rolling element 47 and the second stop block 50, and prolonging the service life of the fourth rolling element 47 and the second stop block 50.

The specific form of the fourth rolling element 47 is not limited, such as a ball bearing or a roller.

It can be understood that in an embodiment where a plurality of second locking structures 40 are provided, all second locking structures 40 may be pneumatic elbow clamps; all second locking structures 40 may also be in the structural forms of the third rolling element 44, the second deflector rod 45 and the second mounting seat 46; or part of the second locking structures 40 may be pneumatic elbow clamps, and the other part of the second locking structures 40 may be in the structural forms of the third rolling element 44, the second deflector rod 45 and the second mounting seat 46.

An embodiment of the present disclosure provides a battery production line for producing batteries. The battery production line includes a first conveying apparatus, a second conveying apparatus, a battery module transport apparatus and at least two quick-change platforms in the above embodiments.

The first conveying apparatus is configured to convey a battery module.

The second conveying apparatus is configured to convey a battery case.

The battery module transport apparatus is provided with a detachable sucker 70 and a plurality of detachable jaw teeth 60, where the plurality of jaw teeth 60 are configured to clamp the battery module, and the sucker 70 is configured to adsorb the battery module, so that the battery module transport apparatus is configured to place the battery module into the battery case.

At least one of the quick-change platforms is configured to place the target object 80 detached from the battery module transport apparatus, and at least one of the quick-change platforms is configured to place the target object 80 to be replaced.

After the first conveying apparatus conveys the battery module to a first conveying position, the battery module transport apparatus drives the sucker 70 and the jaw teeth 60 to move to a picking position, a plurality of clamping jaws clamp the battery module, the sucker 70 adsorbs the battery module, and the battery module transport apparatus drives the battery module to move to a discharge position, so that the battery module enters the battery case which is conveyed to a second conveying position by the second conveying apparatus. Then, the jaw teeth 60 are separated from the battery module, and the sucker 70 is separated from the battery module after vacuum breaking, thus achieving the purpose of placing the battery module into the battery case.

After the battery production line is switched to a battery production mode of a new model, the quick-change platform for placing the target object 80 detached from the battery module transport apparatus is in an empty state, and the quick-change platform is in a first pick-and-place state. At the same time, the other quick-change platform is switched to a second pick-and-place state, the staff places the jaw teeth 60 and sucker 70 of new models corresponding to a battery of a new model on the quick-change platform, and then, the quick-change platform is switched to the first pick-and-place state. The battery module transport apparatus moves to a preset detaching position, and the jaw teeth 60 and sucker 70 of old models are detached from the battery module transport apparatus and placed on the quick-change platform in an empty state. Then, the battery module transport apparatus moves to a preset mounting position and is connected to the jaw teeth 60 and sucker 70 of new models placed on the other quick-change platform, so as to achieve the replacement of the jaw teeth 60 and the sucker 70.

In this way, by arranging a plurality of quick-change platforms in the battery production line, the picking and placing operations performed by the battery module transport apparatus and the picking and placing operations performed by the staff can be performed synchronously, that is, the operation times are overlapped, thus reducing the total operation time and improving the working efficiency.

An embodiment of the present disclosure further provides a control method for controlling the replacement of jaw teeth 60 and a sucker 70 in a battery production line, applied to a control device. For example, the control device may be a programmable logic controller (PLC) device, an industrial personal computer, or the like.

Figure 17:
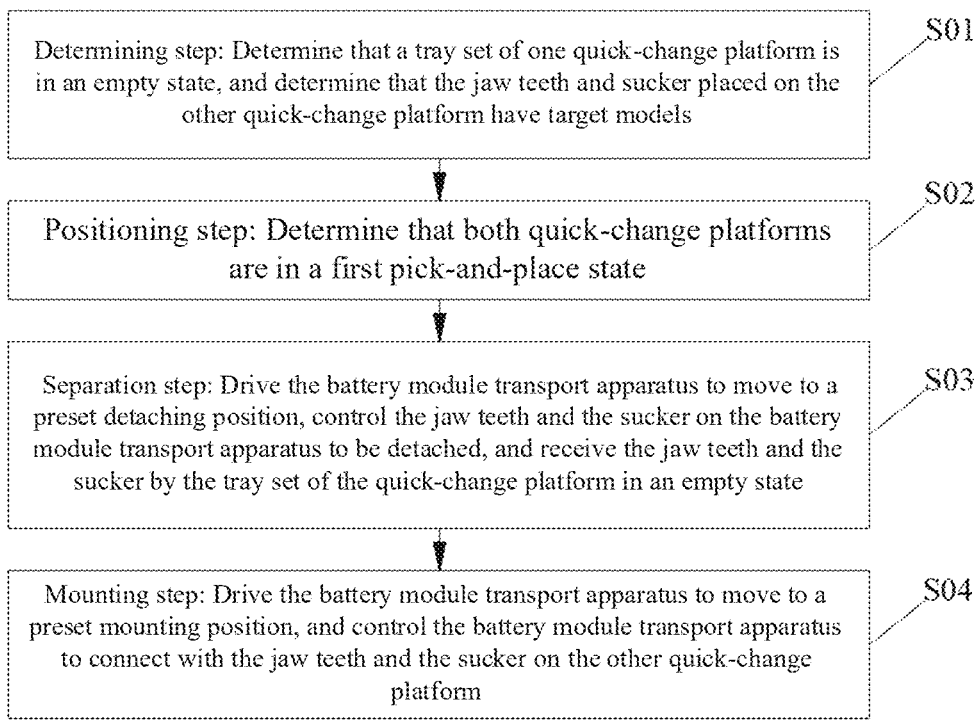
FIG. 17 is a schematic diagram of steps of a control method in an embodiment of the present disclosure.

Referring to FIG. 17, the control method includes:

Step S01: Determining step: It is determined that a tray set of one quick-change platform is in an empty state, and it is determined that the jaw teeth and sucker placed on the other quick-change platform have target models.

An empty state means that jaw teeth 60 and a sucker 70 are not placed on a quick-change platform.

The jaw teeth 60 and sucker 70 of target models refer to the jaw teeth 60 and sucker 70 of new models required after the battery production line replaces the type of produced batteries.

Step S02: Positioning step: It is determined that both quick-change platforms are in a first pick-and-place state.

Both quick-change platforms are in a first pick-and-place state, so that the battery transport apparatus can pick and place the jaw teeth 60 and the sucker 70.

Step S03: Separation step: The battery module transport apparatus is driven to move to a preset detaching position, the jaw teeth and the sucker on the battery module transport apparatus are controlled to be detached, and the jaw teeth and the sucker are received by the tray set of the quick-change platform in an empty state.

That is, after the jaw teeth 60 and sucker 70 of old models are separated from the battery module transport apparatus, the jaw teeth 60 and sucker 70 of old models are received by the tray set 10 of the quick-change platform in an empty state.

Step S04: Mounting step: The battery module transport apparatus is driven to move to a preset mounting position, and the battery module transport apparatus is controlled to connect with the jaw teeth and the sucker on the other quick-change platform.

That is, the battery module transport apparatus is connected to the jaw teeth 60 and sucker 70 of new models placed on the other quick-change platform, so as to adapt to the subsequent production of batteries of new models.

In this way, according to the control method, the cooperation between two quick-change platforms is achieved, the velocity of replacing the jaw teeth 60 and the sucker 70 by the battery module transport apparatus is increased, and the efficiency of production switching in the battery production line is improved.

In some embodiments, before the determining step, the control method further includes:
- a second locking structure 40 of one of the quick-change platforms is controlled to be in a second unlocked state;
- the quick-change platform is controlled to be converted to a second pick-and-place state, and the corresponding second locking structure 40 is controlled to be in a second locked state;
- a first locking structure 15 is controlled to be in a first unlocked state, a movable mounting plate 112 is controlled to be in a fourth pick-and-place state, and the corresponding first locking structure 15 is controlled to be in a first locked state;
- the jaw teeth 60 of the target model are placed on a clamping jaw placing assembly 13, and the sucker 70 of the target model is placed on a sucker placing assembly 12; and
- the first locking structure 15 is controlled to be in a first unlocked state, the movable mounting plate 112 is controlled to be in a third pick-and-place state, and the corresponding first locking structure 15 is controlled to be in a first locked state.

In this way, the purpose of connecting the jaw teeth 60 of the target model and the sucker 70 of the target model by the battery module transport apparatus is achieved. By controlling the first locking structure 15 to be converted between the first locked state and the first unlocked state, the purpose of placing the jaw teeth 60 and sucker 70 of the target models on the quick-change platform is achieved, and it is beneficial for maintaining the stability during placement.

In some embodiments, the operation of controlling a second locking structure 40 of one of the quick-change platforms to be in a second unlocked state specifically includes:
- a second deflector rod 45 is driven to rotate to enable an inner wall of a second sliding groove 45*a* to abut against a third rolling element 44, and a second push rod 43 is driven to move towards a direction away from a second stop block 50 until the projection of a second lock head 40*a* is separated from the second stop block 50 in the projection along the moving direction of the tray set 10.

In this way, the second locking structure 40 can be converted to the second unlocked state in the manner of driving the second deflector rod 45, the steps are simple and intuitive, and it is convenient for the staff to operate.

In some embodiments, the operation of controlling a first locking structure 15 to be in a first unlocked state specifically includes:
- a first deflector rod 155 is driven to rotate to enable an inner wall of a first sliding groove 155*a* to abut against a first rolling element 154, and a first push rod 153 is driven to move towards a direction away from a first stop block 1121 until the projection of a first lock head 15*a* is separated from the first stop block 1121 in the projection along the moving direction of the tray set 10.

In this way, the first locking structure 15 can be converted to the first unlocked state in the manner of driving the first deflector rod 155, the steps are simple and intuitive, and it is convenient for the staff to operate.

In some embodiments, before the operation of controlling the movable mounting plate 112 to be in a third pick-and-place state, the control method further includes:
- a driving element 142 is controlled to drive part of a through-beam photoelectric sensor 141 located on a moving path of the mounting plate 112 to move, so as to enable the through-beam photoelectric sensor 141 to avoid the mounting plate 112.

In this way, the interference generated by the through-beam photoelectric sensor 141 on the movement of the mounting plate 112 is avoided, and the probability of damage to the through-beam photoelectric sensor 141 and the mounting plate 112 caused by collision is reduced.

It can be understood that the emitting end of the through-beam photoelectric sensor 141 may move, or the receiving end of the through-beam photoelectric sensor 141 may move, or both the emitting end and receiving end of the through-beam photoelectric sensor 141 may move.

In some embodiments, after the separation step, the control method further includes:
- the second locking structure 40 of the quick-change platform on which the old jaw teeth 60 and sucker 70 are placed is controlled to be in a second unlocked state;
- the quick-change platform is controlled to be in a second pick-and-place state, and the corresponding second locking structure 40 is controlled to be in a second locked state;
- the first locking structure 15 of the tray set 10 is controlled to be in a first unlocked state, the movable mounting plate 112 is controlled to be in a fourth pick-and-place state, and the corresponding first locking structure 15 is controlled to be in a first locked state; and
- the old jaw teeth 60 are removed from the clamping jaw placing assembly 13, and the old sucker 70 is removed from the sucker placing assembly 12.

In this way, the process of transporting the jaw teeth 60 and sucker 70 of old models does not interfere with the normal work of the battery module transport apparatus, thus improving the production efficiency.

In some embodiments, before the operation of driving the battery module transport apparatus to move to a preset mounting position, the control method further includes:
- a pushing end 134*a* of a pushing element 134 is controlled to move to a position abutting against the jaw teeth 60.

In this way, the pushing element 134 abuts against the jaw teeth 60; on the one hand, it is beneficial for maintaining the stability of the jaw teeth 60 on the quick-change platform, and reducing the probability of the jaw teeth 60 falling off; and on the other hand, in the process of separating the battery module transport apparatus from the jaw teeth 60, it is beneficial for suppressing the trend of removing the jaw teeth 60 from the contour support block 131 due to the movement of the battery module transport apparatus.

Various embodiments/implementations provided in the present disclosure may be combined with each other without conflicting.

The above descriptions are merely preferred embodiments of the present disclosure, but are not intended to limit the present disclosure. It will be apparent to those skilled in the art that various modifications and changes may be made in the present disclosure. Any modifications, equivalent replacements and improvements made within the spirit and principle of the present disclosure shall be included within the scope of protection of the present disclosure.

INDUSTRIAL APPLICABILITY

Embodiments of the present disclosure provide a quick-change platform, a battery production line and a control method, which can improve the production efficiency.

What is claimed is:

1. A quick-change platform for placing target objects for a battery module transport apparatus, the target objects being jaw teeth and a sucker, and the quick-change platform comprising:
a tray set, wherein the tray set is movable, and includes a tray assembly, a sucker placing assembly and a plurality of clamping jaw placing assemblies, the clamping jaw placing assembly and the sucker placing assembly are both arranged on the tray assembly, the clamping jaw placing assembly is configured to place the jaw teeth, and the sucker placing assembly is configured to place the sucker;
the quick-change platform has a first pick-and-place state and a second pick-and-place state;
in the first pick-and-place state, the tray set is located in a first pick-and-place position, so as to enable the tray set to receive the target objects removed from a battery module clamp, or enable the battery module transport apparatus to pick the target objects placed on the tray set; and
in the second pick-and-place state, the tray set is located in a second pick-and-place position, so as to remove the target objects on the tray set, or place the target objects on the tray set.

2. The quick-change platform according to claim 1, wherein the quick-change platform comprises a driving set, and a driving end of the driving set is drivingly connected to the tray set to drive the tray set to move between the first pick-and-place position and the second pick-and-place position.

3. The quick-change platform according to claim 1, wherein at least one of the clamping jaw placing assembly and the sucker placing assembly is detachably connected to the tray assembly.

4. The quick-change platform according to claim 1, wherein
the tray assembly comprises a support plate and a plurality of mounting plates arranged on the support plate, at least one of the mounting plates is movable relative to the support plate, and the clamping jaw placing assembly and the sucker placing assembly respectively correspond to the mounting plate;
the movable mounting plate has a third pick-and-place state and a fourth pick-and-place state;
in the third pick-and-place state, the mounting plate moves to a third pick-and-place position, so as to receive the target objects removed from the battery module transport apparatus, or enable the battery module transport apparatus to pick the target objects; and
in the fourth pick-and-place state, the mounting plate moves to a fourth pick-and-place position, so as to remove the target objects on the tray set, or place the target objects on the tray set.

5. The quick-change platform according to claim 4, wherein the mounting plate provided with the sucker placing assembly is in sliding fit with the support plate.

6. The quick-change platform according to claim 4, wherein the tray set comprises a detection assembly, the detection assembly is arranged on the support plate, and comprises a through-beam photoelectric sensor and a driving element, an emitting end and a receiving end of the through-beam photoelectric sensor are each located on one side of a moving direction of the movable mounting plate, a detection beam emitted from the through-beam photoelectric sensor is used for detecting a placing state of the clamping jaw placing assembly and/or a placing state of the sucker placing assembly, and at least one of the emitting end and the receiving end is drivingly connected to the driving element so as to be driven by the driving element to avoid the mounting plate during the movement of the mounting plate.

7. The quick-change platform according to claim 4, wherein the sucker placing assembly is arranged above the mounting plate; and/or, the clamping jaw placing assembly is arranged above the mounting plate.

8. The quick-change platform according to claim 4, wherein
the tray assembly comprises a first locking structure, the first locking structure is arranged on the support plate and provided with a movable first lock head, the movable mounting plate is provided with a first stop block, and the first locking structure has a first locked state and a first unlocked state;
in the first locked state, the first lock head is capable of forming stop fit with the first stop block along the moving direction of the mounting plate to limit the movement of the mounting plate; and
in the first unlocked state, in the projection along the moving direction of the mounting plate, the projection of the first lock head is separated from the projection of the first stop block, so as to enable the mounting plate to move.

9. The quick-change platform according to claim 8, wherein
the movable mounting plate is configured with two first locking structures correspondingly;
in the third pick-and-place state, one of the first locking structures is in the first locked state;
in the fourth pick-and-place state, the other first locking structure is in the first locked state; and
the two first locking structures in the first locked state have opposite stop directions relative to the mounting plate.

10. The quick-change platform according to claim 8, wherein
the support plate is provided with at least two first limiting blocks;

the two first limiting blocks are arranged at an interval along the moving direction of the mounting plate to form stop fit with the mounting plate along the moving direction thereof; and in the first locked state, the stop direction of the first lock head and the first stop block is opposite to the stop direction of one of the first limiting blocks.

11. The quick-change platform according to claim 8, wherein the first locking structure is a pneumatic elbow clamp, and a pressure head of the first locking structure forms the first lock head.

12. The quick-change platform according to claim 8, wherein the first locking structure comprises a first mounting element, a first elastic element and a first push rod, the first mounting element is arranged on the support plate, an end of the first elastic element along the extension/retraction direction thereof abuts against the first mounting element, the other end abuts against the first push rod to drive the first push rod to extend and retract, and an end of the first push rod away from the first elastic element is provided with the first lock head.

13. The quick-change platform according to claim 12, wherein one side of the first stop block along the moving direction of the mounting plate is provided with a first guide slope, the other side is provided with a first stop surface, and the first stop surface extends along the extension/retraction direction of the first elastic element;

in the unlocked state, the first guide slope faces the first lock head and extends along the moving direction of the mounting plate towards the direction of compressing the first elastic element, so as to enable the first guide slope to push the first push rod to compress the first elastic element during the movement of the mounting plate; and in the locked state, the first lock head is capable of forming stop fit with the first stop surface along the moving direction of the mounting plate.

14. The quick-change platform according to claim 12, wherein the first locking structure further comprises a first rolling element, a first deflector rod and a first mounting seat, one end of the first deflector rod is provided with a first sliding groove, the first rolling element is arranged on the first push rod and is in rotational fit with the first push rod, the first rolling element is embedded in the first sliding groove and is in stop fit with an inner wall of the first sliding groove along the extension/retraction direction of the first elastic element, the first mounting seat is arranged on the support plate, the first deflector rod is rotationally connected to the first mounting seat and has a rotation axis perpendicular to the extension/retraction direction of the first elastic element, the first sliding groove extends perpendicular to the rotation axis of the first deflector rod, and the first rolling element is capable of moving relative to the first deflector rod along the extending direction of the first sliding groove, so that the rotation of the first deflector rod is capable of driving the first elastic element to extend and retract; and/or, an end of the first push rod away from the first elastic element is provided with a second rolling element, the second rolling element is rotationally connected to the first push rod and forms the first lock head.

15. The quick-change platform according to claim 1, wherein the sucker placing assembly comprises a placing plate and positioning pins, the placing plate is arranged on the tray assembly for placing the sucker, and the positioning pins are arranged on one side of the placing plate and extend perpendicular to the thickness direction of the placing plate for insertion into the sucker.

16. The quick-change platform according to claim 15, wherein the positioning pins comprise two first positioning pins and two second positioning pins, an end of the first positioning pin away from the placing plate is conical and is higher than the second positioning pin, the first positioning pins are spaced apart from one of the second positioning pins along a first direction and spaced apart from the other second positioning pin along a second direction, and the first direction is orthogonal to the second direction.

17. The quick-change platform according to claim 1, wherein the clamping jaw placing assembly comprises a contour support block and a floating assembly, the floating assembly is arranged on the tray assembly and has a floating end, the contour support block is arranged on the floating end and is configured to receive the jaw teeth, and the floating end is configured to move in a case that the jaw teeth push the contour support block, and return to an initial position after the pushing force is eliminated.

18. A battery production line, comprising:

a first conveying apparatus for conveying a battery module;

a second conveying apparatus for conveying a battery case;

a battery module transport apparatus, provided with a detachable sucker and a plurality of detachable jaw teeth, wherein the plurality of jaw teeth are configured to clamp the battery module, and the sucker is configured to adsorb the battery module, so that the battery module transport apparatus is configured to place the battery module into the battery case; and at least two quick-change platforms according to claim 1, wherein at least one of the quick-change platforms is configured to place the target objects detached from the battery module transport apparatus, and at least one of the quick-change platforms is configured to place the target objects to be replaced.

* * * * *